(12) United States Patent
Sato et al.

(10) Patent No.: US 11,592,634 B2
(45) Date of Patent: Feb. 28, 2023

(54) OPTICAL FIBER CABLE

(71) Applicant: Fujikura Ltd., Tokyo (JP)

(72) Inventors: Shinnosuke Sato, Sakura (JP); Mizuki Isaji, Sakura (JP); Koji Tomikawa, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 29 days.

(21) Appl. No.: 17/260,792

(22) PCT Filed: Sep. 3, 2019

(86) PCT No.: PCT/JP2019/034515
§ 371 (c)(1),
(2) Date: Jan. 15, 2021

(87) PCT Pub. No.: WO2020/054493
PCT Pub. Date: Mar. 19, 2020

(65) Prior Publication Data
US 2021/0271042 A1    Sep. 2, 2021

(30) Foreign Application Priority Data

Sep. 11, 2018   (JP) .............................. JP2018-169597
Oct. 15, 2018   (JP) .............................. JP2018-194103
Nov. 9, 2018    (JP) .............................. JP2018-211366

(51) Int. Cl.
G02B 6/44   (2006.01)

(52) U.S. Cl.
CPC ............. *G02B 6/443* (2013.01); *G02B 6/449* (2013.01); *G02B 6/4434* (2013.01)

(58) Field of Classification Search
None
See application file for complete search history.

(56) References Cited

U.S. PATENT DOCUMENTS

| 7,382,955 B1 | 6/2008 | Keller |
| 2003/0099447 A1* | 5/2003 | Stingl .................. G02B 6/4408 385/110 |
| 2006/0072886 A1 | 4/2006 | Kim et al. |

(Continued)

FOREIGN PATENT DOCUMENTS

| CN | 1745323 A | 3/2006 |
| CN | 103842871 A | 6/2014 |

(Continued)

OTHER PUBLICATIONS

International Search Report issued in corresponding International Application No. PCT/JP2019/034515 dated Oct. 8, 2019 (2 pages).

*Primary Examiner* — Chris H Chu
(74) *Attorney, Agent, or Firm* — Osha Bergman Watanabe & Burton LLP

(57) ABSTRACT

An optical fiber cable includes: optical fiber units each having optical fibers; a wrapping tube that wraps around the optical fiber units; a filling disposed inside the wrapping tube; and a sheath that covers the wrapping tube. The optical fiber units includes outer units that are disposed at an outermost layer of the optical fiber units. The outer units are twisted in an SZ shape around a cable central axis of the optical fiber cable. The filling is sandwiched between one of the outer units and the wrapping tube in a cross-sectional view.

11 Claims, 11 Drawing Sheets

(56) References Cited

U.S. PATENT DOCUMENTS

| | | | |
|---|---|---|---|
| 2014/0241677 A1 | 8/2014 | Sutehall et al. | |
| 2015/0370026 A1* | 12/2015 | Hudson, II | G02B 6/4429 385/113 |
| 2017/0146760 A1 | 5/2017 | Kaji et al. | |
| 2020/0041739 A1* | 2/2020 | Sato | G02B 6/4432 |

FOREIGN PATENT DOCUMENTS

| | | |
|---|---|---|
| JP | H09-166733 A | 6/1997 |
| JP | H10-170779 A | 6/1998 |
| JP | H11-038284 A | 2/1999 |
| JP | 2001-051169 A | 2/2001 |
| JP | 2002-107589 A | 4/2002 |
| JP | 2012-083418 A | 4/2012 |
| JP | 2014-139609 A | 7/2014 |
| JP | 2015-129837 A | 7/2015 |
| JP | 6255120 B1 | 12/2017 |
| JP | 2018-136376 A | 8/2018 |
| WO | 2018/150947 A1 | 8/2018 |
| WO | 2018/174004 A1 | 9/2018 |

\* cited by examiner

OPTICAL FIBER CABLE

CROSS-REFERENCE TO RELATED APPLICATIONS

Priority is claimed on Japanese Patent Application No. 2018-169597 filed in Japan on Sep. 11, 2018, Japanese Patent Application No. 2018-194103 filed in Japan on Oct. 15, 2018, and Japanese Patent Application No. 2018-211366 filed in Japan on Nov. 9, 2018, the contents of which are incorporated herein by reference in their entirety.

TECHNICAL FIELD

The present invention relates to an optical fiber cable.

BACKGROUND

In the related art, an optical fiber cable in which fillings are disposed around the optical fiber unit has been used.

For example, in the optical fiber cable of Patent Document 1, a plurality of ribbons are stacked and a unit coating layer is provided around the ribbons to form an optical fiber unit. By providing fillings around the optical fiber unit, it is easy to make the shape of the cross section of the optical fiber cable circular.

Further, in the optical fiber cable of Patent Document 2, fillings are disposed so as to be sandwiched between the optical fiber units. Thus, the movement of the optical fiber unit in the optical fiber cable is suppressed.

PATENT LITERATURE

[Patent Document 1]
  Japanese Unexamined Patent Application, First Publication No. 2001-51169
[Patent Document 2]
  Japanese Patent No. 6255120

In this type of optical fiber cable, the optical fiber unit may be twisted in an SZ shape. Here, when the optical fiber units are twisted in an SZ shape, "untwisting" occurs in which the optical fiber unit moves in the direction in which the twisting is canceled. In the optical fiber cable in the related art, the suppression of untwisting may be insufficient.

One or more embodiments of the present invention provide an optical fiber cable in which untwisting is suppressed.

SUMMARY

An optical fiber cable according to one or more embodiments of the present invention includes: a plurality of optical fiber units each having a plurality of optical fibers; a wrapping tube that wraps around the plurality of optical fiber units; at least one filling disposed inside the wrapping tube; and a sheath that covers the wrapping tube, in which a plurality of outer units included in the plurality of optical fiber units that are located in an outermost layer are twisted in an SZ shape around a cable central axis, and the filling is sandwiched between one of the outer units and the wrapping tube in a cross-sectional view.

According to the above embodiments of the present invention, it is possible to generate a frictional force between the outer unit and the fillings and between the fillings and the wrapping tube by using a force of an outer unit to expand radially outward. This makes it possible to provide an optical fiber cable in which untwisting is suppressed.

DETAILED DESCRIPTION

First Embodiment

Hereinafter, an optical fiber cable of the first embodiment will be described with reference to the drawings.

Figure 1:
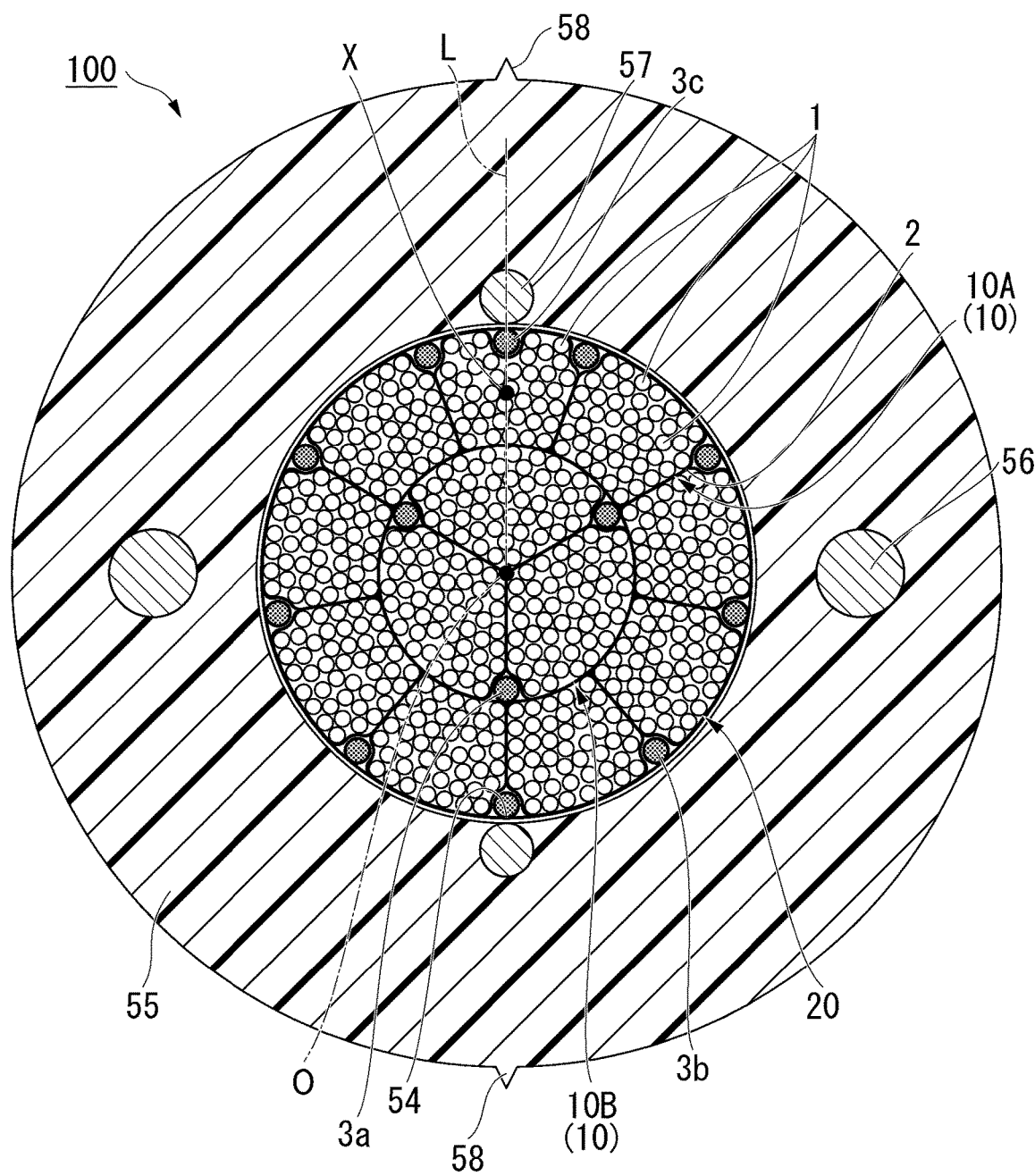
FIG. 1 is a cross-sectional view of an optical fiber cable according to a first embodiment.

As illustrated in FIG. 1, an optical fiber cable 100 includes a core 20 having a plurality of optical fiber units 10, a sheath 55 accommodating the core 20 inside, and a pair of tensile strength members 56 (tension members) and a pair of wire bodies 57, which are embedded in the sheath 55. The core 20 has a wrapping tube 54 that wraps around a plurality of optical fiber units 10.

(Direction Definition)

In the present embodiment, the central axis of the optical fiber cable 100 is referred to as the cable central axis O. Further, the direction along the cable central axis O (longitudinal direction of the optical fiber unit 10) is simply referred to as the longitudinal direction. A cross section orthogonal to the cable central axis O (a cross section orthogonal to the longitudinal direction) is referred to as a cross section. In the cross-sectional view (FIG. 1), the direction intersecting the cable central axis O is called the radial direction, and the direction rotating around the cable central axis O is called the circumferential direction.

When the optical fiber cable 100 is non-circular in the cross-sectional view, the cable central axis O is located at the center of the optical fiber cable 100.

The sheath 55 is formed in a cylindrical shape centered on the cable central axis O. As the material of the sheath 55, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used.

As the material of the wire body 57, a columnar rod made of PP or nylon can be used. Further, the wire body 57 may be formed of yarns in which fibers such as PP or polyester are twisted, and the wire body 57 may have water absorbency.

The pair of wire bodies 57 is disposed so as to sandwich the core 20 in the radial direction. Each wire body 57 is in contact with the outer peripheral surface of the core 20 (the outer peripheral surface of the wrapping tube 54). The number of wire bodies 57 embedded in the sheath 55 may be 1 or 3 or more.

As the material of the tensile strength member 56, for example, a metal wire (such as steel wire), a tension fiber (such as aramid fiber), FRP or the like can be used.

The pair of tensile strength members 56 is disposed so as to sandwich the core 20 in the radial direction. Further, the pair of tensile strength members 56 is disposed at intervals in the radial direction from the core 20. The number of tensile strength members 56 embedded in the sheath 55 may be 1 or 3 or more. Further, the tensile strength member 56 may not be embedded in the sheath 55.

A pair of protrusions 58 projecting radially outward is formed on the outer peripheral surface of the sheath 55. The protrusion 58 extends along the longitudinal direction.

The protrusion 58 and the wire body 57 are disposed at the same position in the circumferential direction. The protrusion 58 serves as a mark when the sheath 55 is incised in order to take out the wire body 57. Instead of the protrusion 58, a mark indicating the position of the wire body 57 may be provided, for example, by making a part of the sheath 55 different in color from the other parts.

The core 20 includes a plurality of optical fiber units 10, a plurality of fillings 3a to 3c, and a wrapping tube 54. The wrapping tube 54 wraps the optical fiber unit 10 and fillings 3a to 3c. Each of the optical fiber units 10 has a plurality of optical fiber core wires or optical fiber strands (hereinafter, simply referred to as optical fibers 1), and a binding material 2 for binding the optical fibers 1. The optical fiber unit 10 and fillings 3a to 3c extend along the longitudinal direction.

The optical fiber unit 10 of the present embodiment is a so-called intermittently-adhered optical fiber ribbon, and when a plurality of optical fibers 1 are pulled in a direction orthogonal to the longitudinal direction, the optical fibers 1 are adhered to each other so as to spread in a mesh form (spider web shape). Specifically, one optical fiber 1 is adhered to adjacent optical fibers 1 on both sides thereof at different positions in the longitudinal direction, and the adjacent optical fibers 1 are spaced apart from each other at a fixed interval in the longitudinal direction and are adhered to each other.

The mode of the optical fiber unit 10 is not limited to the intermittently-adhered optical fiber ribbon, and may be changed as appropriate. For example, the optical fiber unit 10 may be obtained by simply binding the plurality of optical fibers 1 with the binding material 2.

As illustrated in FIG. 1, the optical fiber unit 10 is divided into two layers, that is, a radially inner layer and a radially outer layer. Hereinafter, the optical fiber unit 10 located in the outermost layer is referred to as an outer unit 10A. The optical fiber unit 10 other than the outer unit 10A is referred to as an inner unit 10B. That is, the outer unit 10A and the inner unit 10B are included in the plurality of optical fiber units 10.

In the example of FIG. 1, three inner units 10B are twisted together in an SZ shape or a spiral shape around the cable central axis O. Further, the nine outer units 10A are twisted in an SZ shape around the cable central axis O so as to surround the three inner units 10B. The number of optical fiber units 10 can be changed as appropriate.

In the cross-sectional view, the inner unit 10B located in the inner layer is formed in a fan shape, and the outer unit 10A located in the outermost layer is formed in square. Not limited to the illustrated example, the optical fiber unit 10 having a circular, elliptical, or polygonal cross section may be used. Further, the cross-sectional shape of the optical fiber unit 10 may be deformed. Further, the core 20 may be composed of one layer (layer of the outer unit 10A) without the inner unit 10B.

The binding material 2 has a long string shape and is wound around the plurality of optical fibers 1. The optical fiber 1 is partially exposed from the gap between the binding materials 2. Therefore, when the sheath 55 is incised and the wrapping tube 54 is removed, it is possible to visually recognize the optical fiber 1 from the gap between the binding materials 2. The binding material 2 is made of a thin and highly flexible material such as resin. Therefore, even in the state where the optical fibers 1 are bound with the binding material 2, the optical fibers 1 are appropriately moved to a vacant space in the sheath 55 while deforming the binding material 2. Therefore, the cross-sectional shape of the optical fiber unit 10 in an actual product may not be arranged as illustrated in FIG. 1.

The wrapping tube 54 is formed in a cylindrical shape centered on the cable central axis O. The inner peripheral surface of the wrapping tube 54 is in contact with the radially outer end of the outer unit 10A. Further, the inner peripheral surface of the wrapping tube 54 is in contact with the fillings 3b and 3c. As the wrapping tube 54, a non-woven fabric, a plastic tape member, or the like can be used. The wrapping tube 54 may be made of materials having water absorbency, such as a water-absorbent tape.

The fillings 3a to 3c are formed of a fibrous material such as polyester fiber, aramid fiber, and glass fiber. In addition, the fillings 3a to 3c may be yarns having water absorbency or the like. In this case, it is possible to enhance the waterproof performance inside the optical fiber cable 100.

In the cross-sectional view, the fillings 3a are sandwiched between the outer unit 10A and the inner unit 10B. The filling 3b is sandwiched between the outer units 10A adjacent to each other in the circumferential direction, and are in contact with the wrapping tube 54. The filling 3c is sandwiched between one outer unit 10A and the wrapping tube 54.

The filling 3a is twisted together with the inner unit 10B. The fillings 3b, 3c are twisted together with the outer unit 10A.

The fillings 3b, 3c are in contact with the outer unit 10A. The filling 3a is in contact with the outer unit 10A and the inner unit 10B. Here, the binding material 2 has a thin and long string shape, and is wound around a bundle of the optical fibers 1 in a spiral shape, for example. Therefore, a part of the optical fiber 1 which is not covered with the string-shaped binding material 2 is partially in contact with the fillings 3a to 3c.

The optical fiber 1 usually has a structure in which an optical fiber bare fiber formed of glass is coated with a coating material such as a resin. Therefore, the surface of the optical fiber 1 is smooth, and the friction coefficient when the optical fibers 1 come into contact with each other is relatively small. On the other hand, fillings 3a to 3c are formed of a fibrous material. Therefore, the friction coefficient when the fillings 3a to 3c are in contact with the optical fibers 1 is larger than the friction coefficient when the optical fibers 1 are in contact with each other.

From the above, it is possible to increase the frictional resistance when the optical fiber units 10 move relative to each other, by disposing the fillings 3a to 3c so as to be sandwiched between the plurality of optical fiber units 10.

This makes it possible to suppress the movement of the optical fiber unit 10 in the optical fiber cable 100.

Incidentally, the plurality of optical fiber units 10 are twisted together, with the cable central axis O as the center of twisting. When the optical fiber unit 10 tends to untwist, the bundle of the optical fiber unit 10 tends to expand radially outward. That is, the outer unit 10A is pressed against the wrapping tube 54 by the force trying to untwist. Here, in the present embodiment, fillings 3b and 3c are sandwiched between the outer unit 10A and the wrapping tube 54 in the cross-sectional view.

According to this configuration, when the bundle of the optical fiber unit 10 tends to expand radially outward, fillings 3b and 3c are compressed in the radial direction between the outer unit 10A and the wrapping tube 54. That is, the fillings 3b and 3c twisted together with the outer unit 10A are pressed against the wrapping tube 54. Since the fillings 3b and 3c are formed of a fibrous material, the friction coefficient between the optical fiber 1 and the fillings 3b and 3c, and the friction coefficient between the fillings 3b and 3c and the wrapping tube 54 are larger than the friction coefficient between the optical fiber 1 and the wrapping tube 54. Therefore, the frictional force generated when the outer unit 10A is pressed against the wrapping tube 54 with the fillings 3b and 3c sandwiched between them is larger than the frictional force generated when the outer unit 10A is directly pressed against the wrapping tube 54.

That is, in the present embodiment, when the outer unit 10A tends to expand radially outward, the fillings 3b and 3c generate a large frictional force. Due to this frictional force, the outer unit 10A is less likely to move with respect to the wrapping tube 54, and it is possible to suppress the untwisting of the outer unit 10A.

Further, in the present embodiment, the filling 3c is located on the straight line L passing through the center point X of the outer unit 10A and the cable central axis O in the cross-sectional view. With this configuration, the force that the outer unit 10A tends to expand radially outward can be more efficiently converted into a frictional force. Therefore, it is possible to more reliably suppress the untwisting of the outer unit 10A.

Further, in the present embodiment, in the cross-sectional view, the filling 3c is surrounded by one outer unit 10A and the wrapping tube 54. Therefore, when the bundle of the optical fiber unit 10 tends to expand radially outward, the fillings 3c are more reliably sandwiched between the outer unit 10A and the wrapping tube 54. Further, the outer unit 10A prevents the fillings 3c from moving radially inward, so that the state in which the fillings 3c are in contact with the wrapping tube 54 can be more reliably maintained. Therefore, it is possible to more reliably generate the frictional force due to the fillings 3c, and to suppress the untwisting.

The center point X in the present specification is the center of the outer unit 10A in a cross-sectional view. Since the outer unit 10A is twisted around the cable central axis O, the outer unit 10A tends to expand radially outward due to untwisting. The direction in which the outer unit 10A expands is a direction that starts from the cable central axis O and passes through the center point X (center of the outer unit 10A). Therefore, by locating the fillings 3c on the straight line L passing through the cable central axis O and the center point X, the frictional force generated by the fillings 3c due to the force that the outer unit 10A tends to expand becomes large, and it is possible to effectively suppress the untwisting.

EXAMPLES

Hereinafter, the above first embodiment will be described with reference to specific examples. The present invention is not limited to the following examples.

Example 1

As Example 1, an optical fiber cable having a cross-sectional structure as illustrated in FIG. 1 is prepared.

The number of optical fibers 1 included in each optical fiber unit 10 is 144. The three inner units 10B are twisted in an SZ shape, and the nine outer units 10A are twisted in an SZ shape on the outer circumference thereof. That is, the total number of optical fiber units 10 is 12, and the total number of optical fibers 1 is 1728. Water-absorbent yarns are used as fillings 3a, 3b, and 3c. Three fillings 3a, eight fillings 3b, and one filling 3c are disposed.

The set angle of the twisting device (oscillator) when twisting the optical fiber unit 10 is adjusted such that the twist angle (introduction angle) actually introduced is ±150°. The "set angle" is in a range of angles at which the oscillator is oscillated. For example, when the set angle is ±500°, the oscillator repeats the operation of oscillating 500° in the CW direction and then oscillating 500° in the CCW direction.

The manufactured optical fiber cable is cut at predetermined intervals in the longitudinal direction, and the position of the specific outer unit 10A or the optical fiber 1 included in the outer unit 10A in the circumferential direction is measured on each cut surface. The rotation angle of a specific outer unit 10A or the optical fiber 1 included in the outer unit 10A with respect to the cable central axis O is defined as the introduction angle. The larger the difference between the set angle and the introduction angle, the larger the outer unit 10A is untwisted.

The twisted optical fiber unit 10 is wrapped with a wrapping tube 54 and further covered with a sheath 55 to prepare an optical fiber cable.

Example 2

As Example 2, an optical fiber cable is prepared in which the number of fillings 3b and 3c is changed from Example 1. Three fillings 3a, six fillings 3b, and three fillings 3c are disposed. Other conditions are the same as in Example 1.

Example 3

As Example 3, an optical fiber cable is prepared in which the numbers of the fillings 3a, 3b, and 3c are changed from those in Example 1. No fillings 3a and 3b are disposed, and only six fillings 3c are disposed. Other conditions are the same as in Example 1.

Example 4

Figure 2:
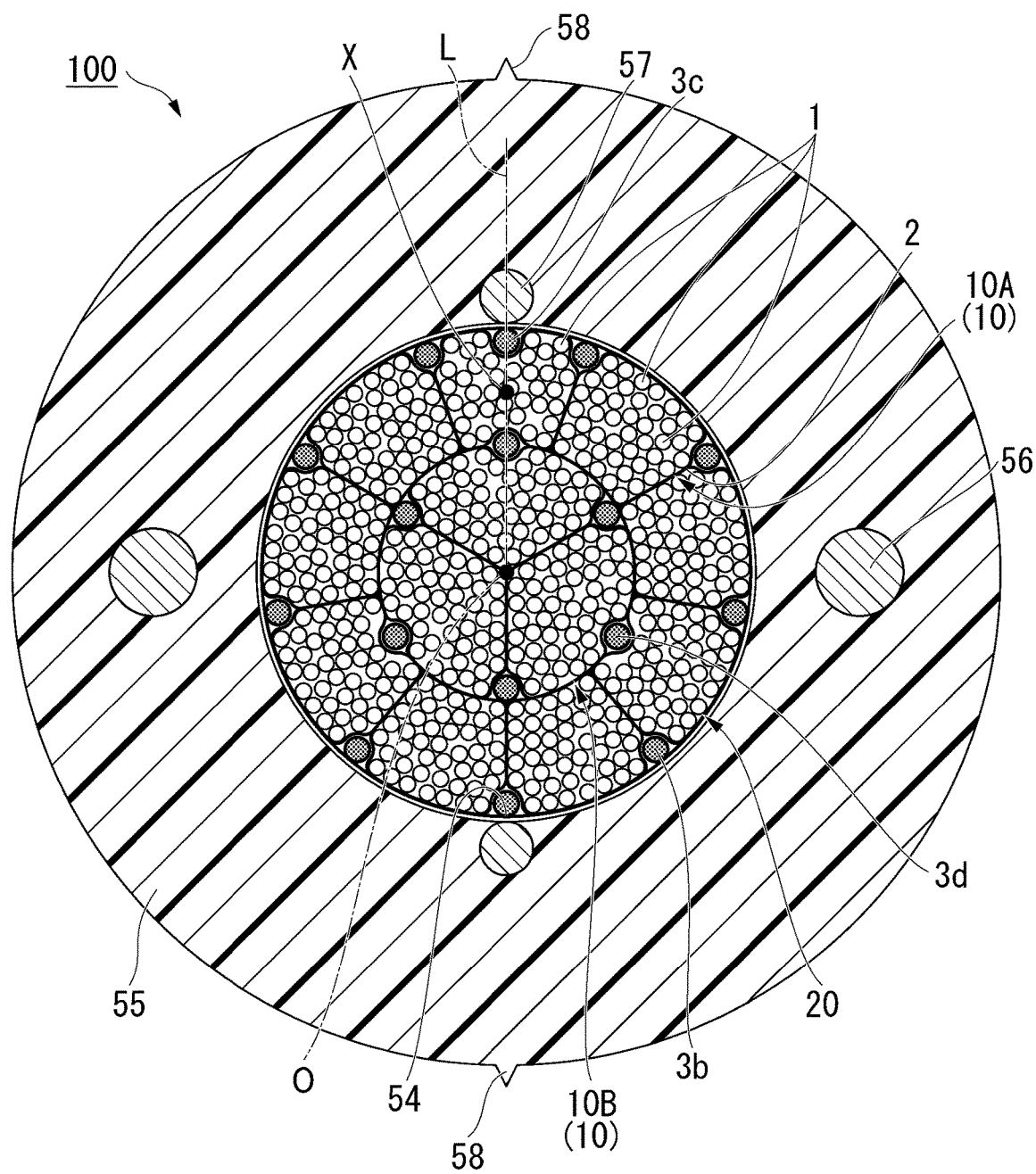
FIG. 2 is a cross-sectional view of an optical fiber cable according to a modified example of the first embodiment.

As Example 4, an optical fiber cable is prepared in which the numbers of the fillings 3a, 3b, and 3c are changed from those in Example 1. The fillings 3a are not disposed, and six fillings 3b and three fillings 3c are disposed. Further, three fillings 3d as illustrated in FIG. 2 are disposed. The fillings 3d are radially sandwiched between the inner unit 10B and the outer unit 10A. Each filling 3d is disposed between one outer unit 10A and one inner unit 10B. Other conditions are the same as in Example 1.

Example 5

As Example 5, an optical fiber cable is prepared in which the numbers of the fillings 3a, 3b, and 3c are changed from those in Example 1. The fillings 3b are not disposed, and three fillings 3a and nine fillings 3c are disposed. Other conditions are the same as in Example 1.

Comparative Example 1

As Comparative Example 1, an optical fiber cable 100 provided with fillings 3a and 3b without fillings 3c is prepared. Three fillings 3a and nine fillings 3b are disposed. Other conditions are the same as in Example 1.

Table 1 shows the results of checking the introduction angle and sheath twisting of each of the optical fiber cables of Examples 1 to 5 and Comparative Example 1.

TABLE 1

|  | Number of fillings (pieces) | | | | | Set angle[°] | Introduction angle[°] | Sheath twisting | Determination |
| --- | --- | --- | --- | --- | --- | --- | --- | --- | --- |
|  | 3a | 3b | 3c | 3d | Total | | | | |
| Example 1 | 3 | 8 | 1 | 0 | 12 | ±500 | ±150 | ±10° | OK |
| Example 2 | 3 | 6 | 3 | 0 | 12 | ±400 | ±150 | ±5° | OK |
| Example 3 | 0 | 0 | 6 | 0 | 6 | ±400 | ±150 | ±5° | OK |
| Example 4 | 0 | 6 | 3 | 3 | 12 | ±400 | ±150 | ±5° | OK |
| Example 5 | 3 | 0 | 9 | 0 | 12 | ±300 | ±150 | ±4° | OK |
| Comparative Example 1 | 3 | 9 | 0 | 0 | 12 | ±700 | ±150 | ±45° | NG |

"Sheath twisting" in Table 1 indicates the degree of sheath twisting in the prepared optical fiber cable. More specifically, it shows how much the position of the protrusion 58 in the circumferential direction changes along the longitudinal direction. For example, when the sheath twisting is ±10°, the position of the protrusion 58 in the circumferential direction changes within a range of ±10° around the cable central axis O. When the degree of sheath twisting is large, the optical fiber cable meanders, leading to a decrease in installing workability and a decrease in the length of an optical cable that can be wound around the drum.

In the "Determination" field, the result is good (OK) when the sheath twisting is ±10° or less, and the result is insufficient (NG) when the sheath twisting exceeds ±10°. The sheath twisting increases as the set angle increases. This is because the larger the set angle, the stronger the twisted optical fiber unit 10 tends to untwist, and the sheath 55 is twisted around the cable central axis O.

As shown in Table 1, in Examples 1 to 5, the sheath twisting is ±10° or less, and good results are obtained. On the other hand, in Comparative Example 1 in which the fillings 3c are not disposed, the sheath twisting is ±45°, and the result is insufficient.

It is considered that the reason why good results are obtained in Examples 1 to 5 is that the set angle for setting the introduction angle to ±150° is ±500° or less, and the set angle is relatively small. The reason why the set angle is able to be reduced in such a manner is that the untwisting of the outer unit 10A can be reduced by the filling 3c. That is, when the optical fiber unit 10 including the outer unit 10A tends to untwist and expand radially outward, the filling 3c is sandwiched between the outer unit 10A and the wrapping tube 54 to generate a frictional force.

On the other hand, in Comparative Example 1, since the fillings 3c are not provided, the frictional force generated between the outer unit 10A and the wrapping tube 54 when the optical fiber unit 10 tends to untwist is relatively small. Therefore, untwisting is likely to occur, and the set angle for setting the introduction angle to ±150° is ±700°, and the set angle is relatively large. Then, it is considered that the larger the set angle, the stronger the force with which the outer unit 10A twists the sheath 55, so that the angle of the sheath twisting becomes larger.

From the above results, it is checked that it is possible to reduce the untwisting of the outer unit 10A by providing at least one filling 3c on the straight line L passing through the cable central axis O and the outer unit 10A. Further, it is found that as a result of reducing the untwisting of the outer unit 10A, it is possible to reduce the set angle, and to suppress the twisting generated in the sheath 55.

Further, comparing Example 2 and Example 5, the total number of fillings 3b and 3c in contact with the wrapping tube 54 is the same, but the set angle for setting the introduction angle to ±150° is smaller in Example 5. Further, the twisting generated in the sheath 55 is also smaller in Example 5. That is, untwisting is more effectively suppressed in Example 5 than in Example 2. This is because that the fillings 3c are located on a straight line passing through the cable central axis O and the center point X of the outer unit 10A, so that the fillings 3c are less likely to move radially inward, and it is possible to more reliably maintain the state in which the fillings 3c are in contact with the wrapping tube 54. Thus, it is possible to effectively convert the force that the outer unit 10A tends to expand radially outward into a frictional force.

Further, in Example 3, good result is obtained even when the total number of fillings is smaller, as compared with the other Examples 1, 2, 4, and 5. Then, in Example 3, only the fillings 3c are disposed. From this result, it is checked that the effect of suppressing untwisting by the fillings 3c is larger than that of other fillings.

It should be noted that the technical scope of the present invention is not limited to the above-described embodiments, and various modifications can be made without departing from the spirit of the present invention.

For example, in the example of FIG. 1, the core 20 includes a two-layer optical fiber unit 10. However, the number of layers of the optical fiber unit included in the core 20 may be 1 or 3 or more.

Further, when the core 20 includes a plurality of layers of optical fiber units, no fillings may be disposed between the optical fiber units (inner unit 10B in the example of FIG. 1) included in the layers other than the outermost layer.

Figure 3:
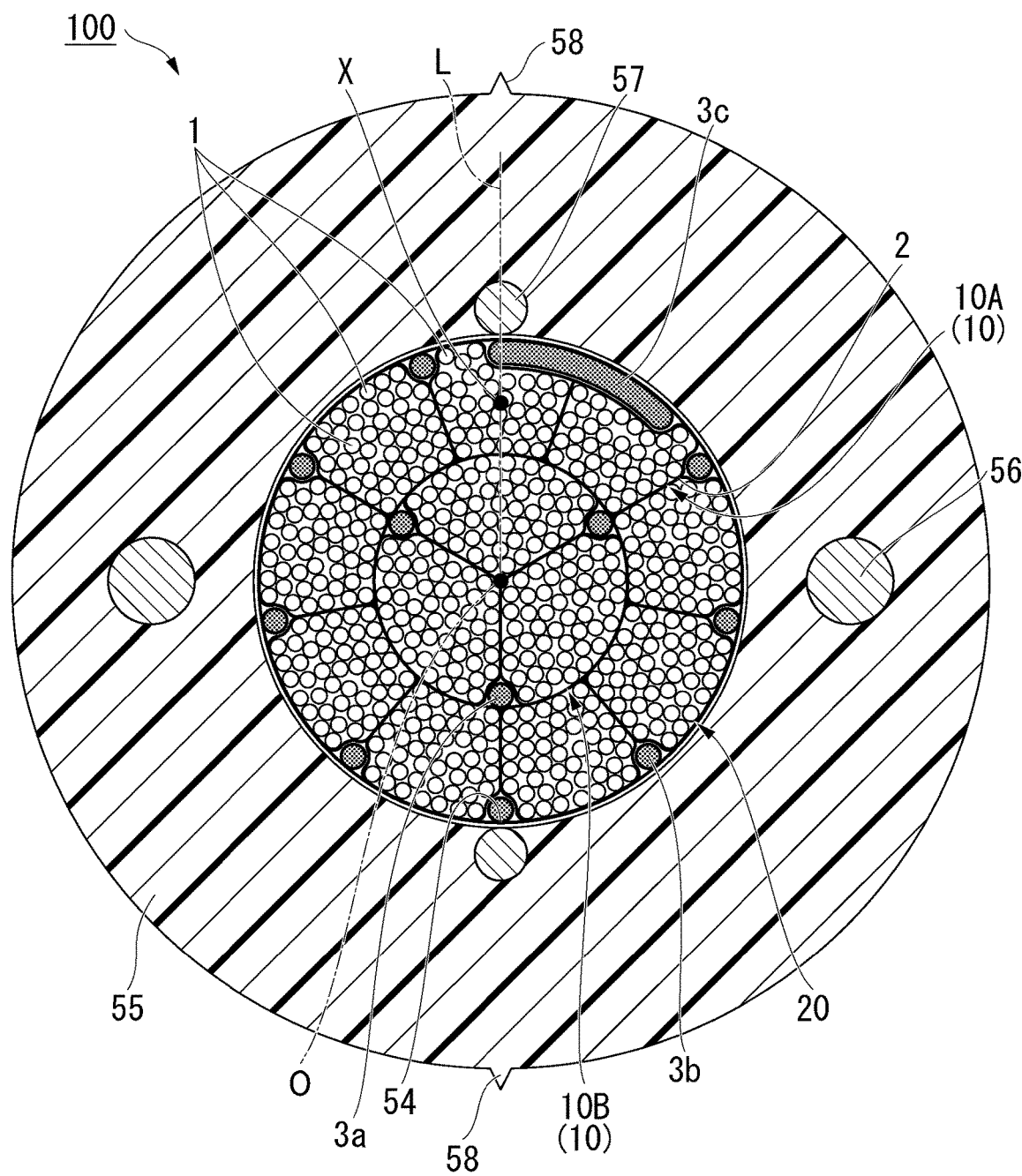
FIG. 3 is a cross-sectional view of an optical fiber cable according to another modification of the first embodiment.

Further, in the above-described embodiments, the filling 3c is sandwiched between one outer unit 10A and the wrapping tube 54. However, as illustrated in FIG. 3, the fillings 3c may be sandwiched between the plurality of outer units 10A and the wrapping tube 54. Even in this case, due to the force that the outer unit 10A tends to expand radially outward, it is possible to generate a frictional force between the outer unit 10A and the fillings 3c and between the fillings 3c and the wrapping tube 54. Further, since the fillings 3c are located on the straight line L passing through the cable central axis O and the center point X of the outer unit 10A, the force that the outer unit 10A tends to expand radially outward is able to be converted into frictional force more efficiently. Therefore, it is possible to more reliably suppress the untwisting of the outer unit 10A.

Second Embodiment

Hereinafter, an optical fiber cable of a second embodiment will be described with reference to the drawings. The same members as in the first embodiment are denoted by the same reference numerals, and a description thereof is omitted.

Figure 4:
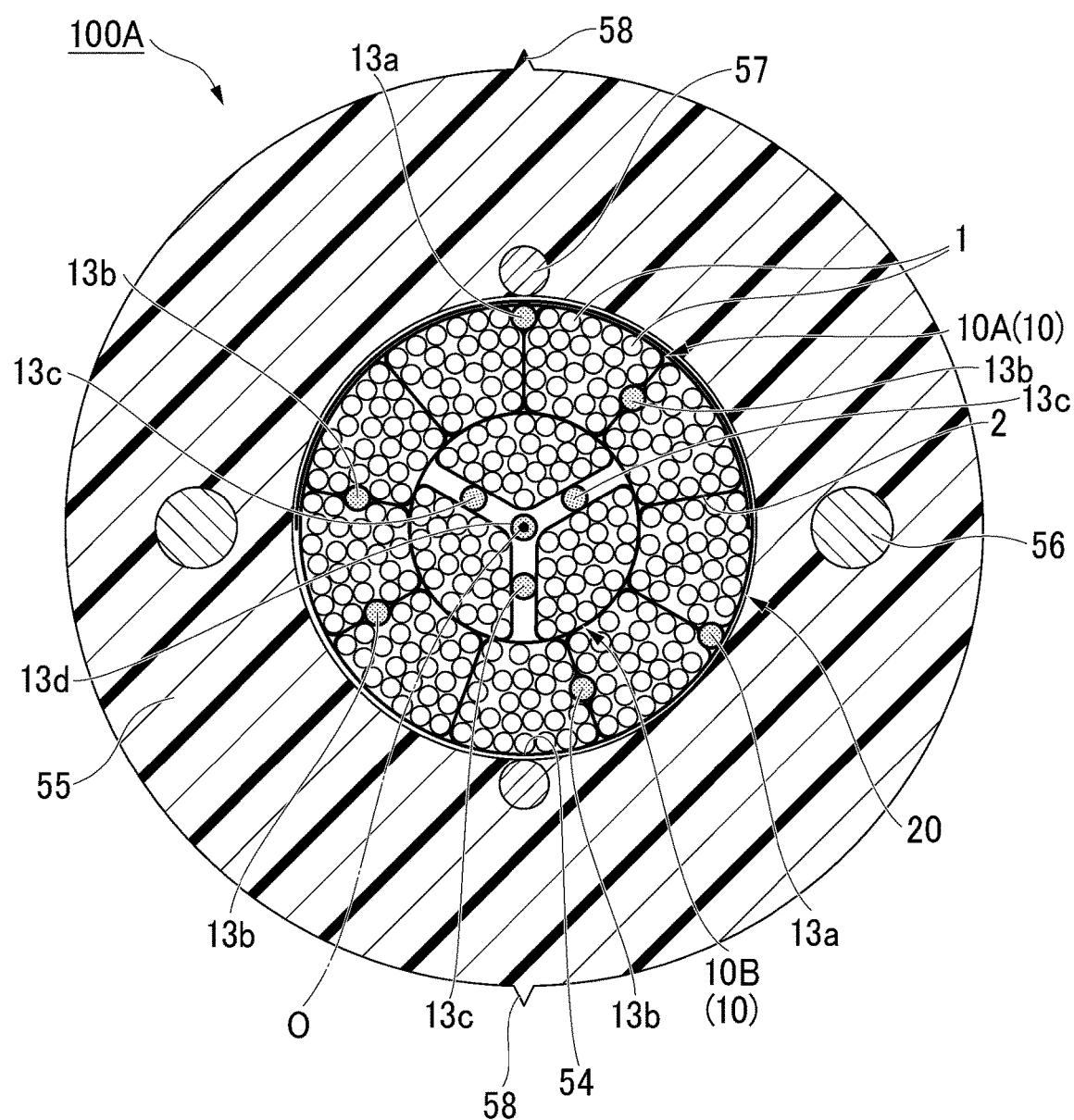
FIG. 4 is a cross-sectional view of an optical fiber cable according to a second embodiment.

As illustrated in FIG. 4, an optical fiber cable 100A includes a core 20 having a plurality of optical fiber units 10, a sheath 55 accommodating the core 20 inside, and a pair of tensile strength members 56 (tension members) and a pair of wire bodies 57, which are embedded in the sheath 55. The core 20 has a wrapping tube 54 that wraps around a plurality of optical fiber units 10.

(Direction Definition)

In the present embodiment, the central axis of the optical fiber cable 100A is referred to as the cable central axis O. Further, the longitudinal direction of the optical fiber cable 100A (longitudinal direction of the optical fiber unit 10) is simply referred to as the longitudinal direction. A cross section orthogonal to the longitudinal direction (a cross section orthogonal to the cable central axis O) is called a cross section. In the cross-sectional view (FIG. 4), the direction intersecting the cable central axis O is called the radial direction, and the direction rotating around the cable central axis O is called the circumferential direction.

When the optical fiber cable 100A is non-circular in the cross-sectional view, the cable central axis O is located at the center of the optical fiber cable 100A.

The sheath 55 is formed in a cylindrical shape centered on the cable central axis O. As the material of the sheath 55, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used.

As the material of the wire body 57, a cylindrical rod made of PP, nylon, or the like can be used. Further, the wire body 57 may be formed of yarns in which fibers such as PP or polyester are twisted, and the wire body 57 may have water absorbency.

The pair of wire bodies 57 is disposed so as to sandwich the core 20 in the radial direction. Each wire body 57 is in contact with the outer peripheral surface of the core 20 (the outer peripheral surface of the wrapping tube 54). The number of wire bodies 57 embedded in the sheath 55 may be 1 or 3 or more.

As the material of the tensile strength member 56, for example, a metal wire (such as steel wire), a tension fiber (such as aramid fiber), FRP or the like can be used.

The pair of tensile strength members 56 is disposed so as to sandwich the core 20 in the radial direction. Further, the pair of tensile strength members 56 is disposed at intervals in the radial direction from the core 20. The number of tensile strength members 56 embedded in the sheath 55 may be 1 or 3 or more. Further, the tensile strength member 56 may not be embedded in the sheath 55.

A pair of protrusions 58 projecting radially outward is formed on the outer peripheral surface of the sheath 55. The protrusion 58 extends along the longitudinal direction.

The protrusion 58 and the wire body 57 are disposed at the same position in the circumferential direction. The protrusion 58 serves as a mark when the sheath 55 is incised in order to take out the wire body 57. Instead of the protrusion 58, a mark indicating the position of the wire body 57 may be provided, for example, by making a part of the sheath 55 different in color from the other parts.

The core 20 includes a plurality of optical fiber units 10, a plurality of fillings 13a to 13d, and a wrapping tube 54. The wrapping tube 54 wraps the optical fiber unit 10 and fillings 13a to 13d. Each of the optical fiber units 10 has a plurality of optical fiber core wires or optical fiber strands (hereinafter, simply referred to as optical fibers 1), and a binding material 2 for binding the optical fibers 1. The optical fiber unit 10 and fillings 13a to 13d extend along the longitudinal direction.

The optical fiber unit 10 of the present embodiment is a so-called intermittently-adhered optical fiber ribbon, and when a plurality of optical fibers 1 are pulled in a direction orthogonal to the longitudinal direction, the optical fibers 1 are adhered to each other so as to spread in a mesh form (spider web shape). Specifically, one optical fiber 1 is adhered to adjacent optical fibers 1 on both sides thereof at different positions in the longitudinal direction, and the adjacent optical fibers 1 are spaced apart from each other at a fixed interval in the longitudinal direction and are adhered to each other.

The mode of the optical fiber unit 10 is not limited to the intermittently-adhered optical fiber ribbon, and may be changed as appropriate. For example, the optical fiber unit 10 may be obtained by simply binding the plurality of optical fibers 1 with the binding material 2.

As illustrated in FIG. 4, the optical fiber units 10 are disposed so as to be divided into two layers, that is, a radially inner layer and a radially outer layer. In the present specification, the optical fiber unit 10 located in the outermost layer is referred to as an outer unit 10A. Further, the optical fiber unit 10 located radially inside the outer unit 10A is referred to as an inner unit 10B.

In the example of FIG. 4, three inner units 10B are twisted together in an SZ shape or a spiral shape around the cable central axis O. Further, the nine outer units 10A are twisted in an SZ shape around the cable central axis O so as to surround the three inner units 10B. The number of optical fiber units 10 can be changed as appropriate.

In the cross-sectional view, the inner unit 10B located in the inner layer is formed in a fan shape, and the outer unit 10A located in the outermost layer is formed in square. In addition, the present invention is not limited to the illustrated example, the optical fiber unit 10 having a circular, elliptical, or polygonal cross section may be used. Further, the cross-sectional shape of the optical fiber unit 10 may be deformed. Further, the core 20 may be composed of one layer (layer of the outer unit 10A) without the inner unit 10B.

The binding material 2 has a long string shape and is wound around the plurality of optical fibers 1. The optical fiber 1 is partially exposed from the gap between the binding materials 2. Therefore, when the sheath 55 is incised and the wrapping tube 54 is removed, it is possible to visually recognize the optical fiber 1 from the gap between the binding materials 2. The binding material 2 is made of a thin and highly flexible material such as resin. Therefore, even in the state where the optical fibers 1 are bound with the binding material 2, the optical fibers 1 are appropriately moved to a vacant space in the sheath 55 while deforming the binding material 2. Therefore, the cross-sectional shape of the optical fiber unit 10 in an actual product may not be arranged as illustrated in FIG. 4.

The wrapping tube 54 is formed in a cylindrical shape centered on the cable central axis O. The inner peripheral surface of the wrapping tube 54 is in contact with the radially outer end of the outer unit 10A. Further, the inner peripheral surface of the wrapping tube 54 is in contact with the fillings 13a. As the wrapping tube 54, a non-woven fabric, a plastic tape member, or the like can be used. The wrapping tube 54 may be made of materials having water absorbency, such as a water-absorbent tape.

The fillings 13a to 13d are formed of a fibrous material such as polyester fiber, aramid fiber, and glass fiber. The fillings 13a to 13d may be yarns having water absorbency or the like. In this case, it is possible to enhance the waterproof performance inside the optical fiber cable 100A.

In the cross-sectional view, the fillings 13a are sandwiched between the outer units 10A adjacent to each other in the circumferential direction and are in contact with the inner peripheral surface of the wrapping tube 54. The filling 13a is disposed between two outer units 10A and the wrapping tube 54. The fillings 13b are sandwiched between the outer units 10A adjacent to each other in the circumferential direction, but are not in contact with the wrapping tube 54. The fillings 13a and 13b are twisted together with the outer unit 10A in an SZ shape around the cable central axis O.

The fillings 13c are sandwiched between the inner units 10B adjacent to each other in the circumferential direction. The fillings 13c are located radially inside the fillings 13a and 13b, and are not in contact with the inner peripheral surface of the wrapping tube 54. The fillings 13c are twisted together with the inner unit 10B in an SZ shape or a spiral shape around the cable central axis O. The fillings 13c may not be disposed.

Figure 7:
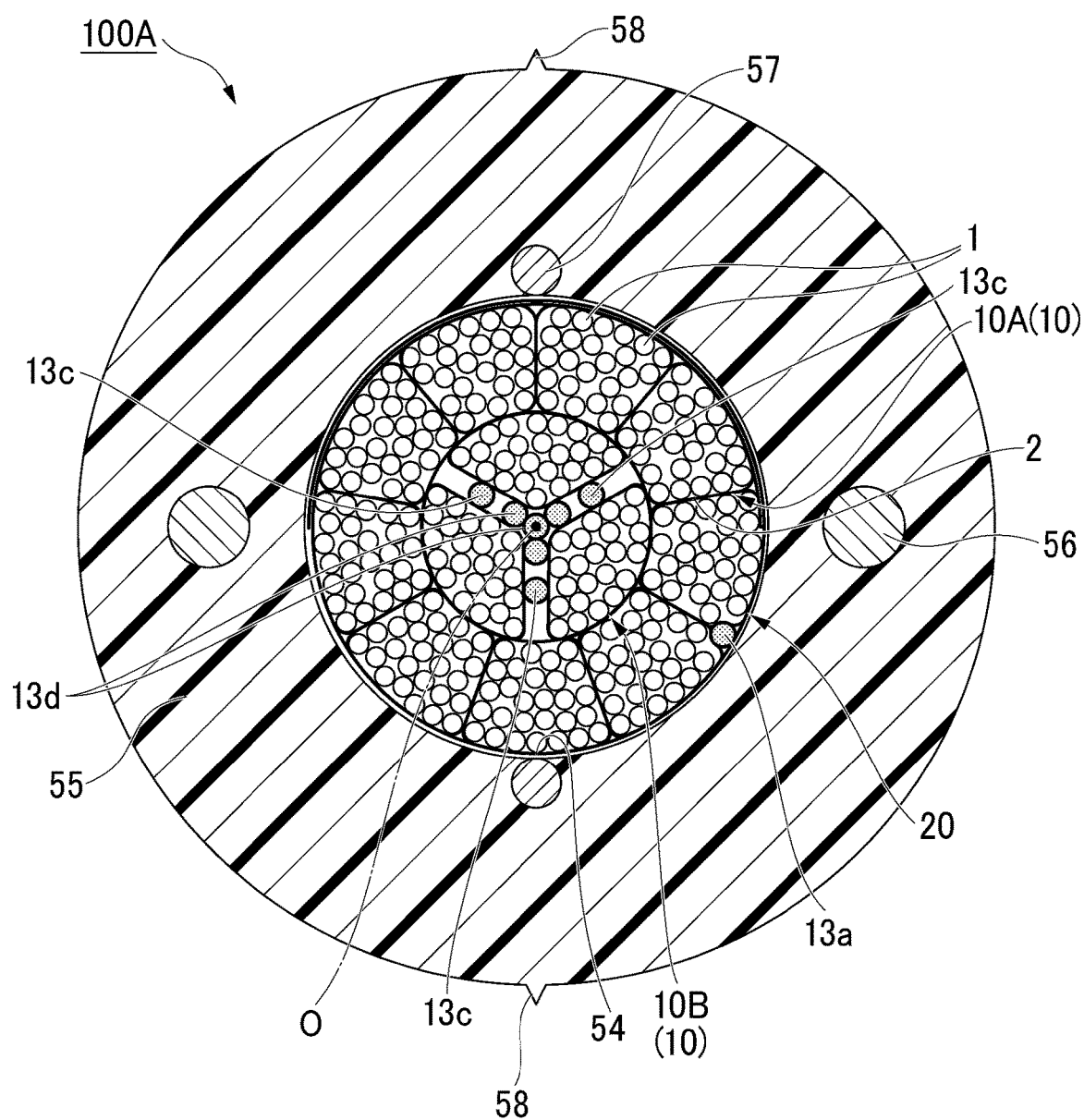
FIG. 7 is a cross-sectional view of an optical fiber cable according to a modified example of the second embodiment.

The filling 13d is located at the center of the optical fiber cable 100A. In the example of FIG. 4, one filling 13d is disposed coaxially with the cable central axis O. However, as illustrated in FIG. 7, a plurality of fillings 13d may be disposed at the center of the optical fiber cable 100A. Further, the fillings 13d may not be located coaxially with the cable central axis O. The fillings 13d may be twisted together with the inner unit 10B in an SZ shape or a spiral shape around the cable central axis O. Alternatively, the fillings 13d may not be twisted together with the inner unit 10B. Further, the fillings 13d may not be disposed.

The fillings 13a and 13b are in contact with the outer unit 10A. The fillings 13c and 13d are in contact with the inner unit 10B. Here, the binding material 2 has a thin and long string shape, and is wound around a bundle of the optical fibers 1 in a spiral shape, for example. Therefore, a part of the optical fiber 1 which is not covered with the string-shaped binding material 2 is partially in contact with the fillings 13a to 13d.

The optical fiber 1 usually has a structure in which an optical fiber bare fiber formed of glass is coated with a coating material such as a resin. Therefore, the surface of the optical fiber 1 is smooth, and the friction coefficient when the optical fibers 1 come into contact with each other is relatively small. On the other hand, the fillings 13a to 13d are formed of a fibrous material. Therefore, the friction coefficient when the fillings 13a to 13d are in contact with the optical fibers 1 is larger than the friction coefficient when the optical fibers 1 are in contact with each other.

From the above, it is possible to increase the frictional resistance when the optical fiber units 10 move relative to each other, by disposing the fillings 13a to 13d so as to be sandwiched between the plurality of optical fiber units 10. This makes it possible to suppress the movement of the optical fiber unit 10 in the optical fiber cable 100A.

Third Embodiment

Hereinafter, an optical fiber cable of a third embodiment will be described with reference to the drawings. The same members as in the first embodiment are denoted by the same reference numerals, and a description thereof is omitted.

Figure 5:
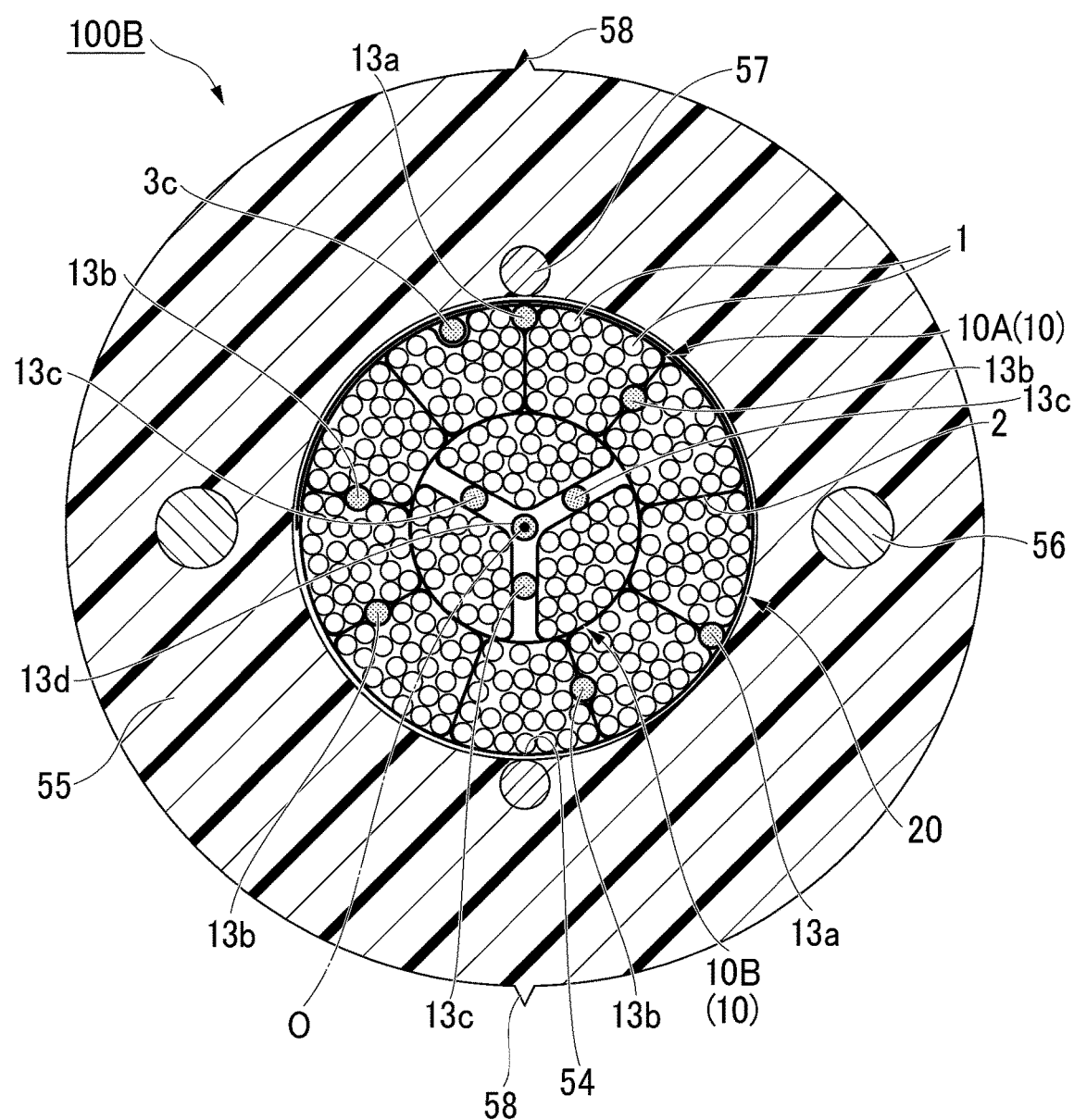
FIG. 5 is a cross-sectional view of an optical fiber cable according to a third embodiment.

FIG. 5 indicates an optical fiber cable 100B according to the third embodiment. The third embodiment has the same basic configuration as the second embodiment, but the optical fiber cable 100B is different from the optical fiber cable 100A of FIG. 4 in having fillings 3c.

In the optical fiber cable 100B, the core 20 includes a plurality of optical fiber units 10, a plurality of fillings 13a to 13c, 3c, and a wrapping tube 54. The wrapping tube 54 wraps the optical fiber unit 10 and the fillings 13a to 13c, 3c.

The filling 3c is sandwiched between one outer unit 10A and the wrapping tube 54. The fillings 3c are twisted together with the outer unit 10A in an SZ shape.

The fillings 3c are in contact with the wrapping tube 54 and the outer unit 10A. Further, the part of the optical fiber 1 which is not covered with the string-shaped binding material 2 is partially in contact with the filling 3c.

Further, in the cross-sectional view, the fillings 3c may be located on the straight line L passing through the center point X of the outer unit 10A and the cable central axis O.

Incidentally, in the second and third embodiments, the outer unit 10A is twisted in an SZ shape. As a result, when the optical fiber cables 100A and 100B are bent, it is possible to improve the workability of the mid-span branching, while suppressing the action of tension or strain on the optical fiber 1 included in the outer unit 10A.

On the other hand, when the outer unit 10A is twisted in an SZ shape, it may be insufficient to suppress the untwisting of the outer unit 10A. When a compressive force acts on the optical fiber cables 100A and 100B, it is also required to suppress the lateral pressure acting on the outer unit 10A.

Therefore, in the second and third embodiments, the amounts of fillings 13a and 13b disposed between the outer units 10A and the fillings 3c disposed between one outer unit 10A and the wrapping tube 54 are optimized. Hereinafter, the second and third embodiments will be described with reference to specific examples. The present invention is not limited to the following examples.

(Positions of Fillings) First, the result of checking the effect of disposing the fillings 13a and 13b between the outer units 10A will be described. Here, eight optical fiber cables (Examples 6 to 9 and Comparative Examples 2 to 5) shown in Table 2 are prepared. In Examples 6 to 9 and Comparative Examples 2 to 5, water-absorbent yarns are used as fillings 13a to 13d.

TABLE 2

|  | Number of fillings (pieces) |  |  |  | Set angle [°] | Introduction angle [°] | Determination |
|---|---|---|---|---|---|---|---|
|  | 13a | 13b | 13c | 13d |  |  |  |
| Example 6 | 8 | 0 | 0 | 0 | ±400 | ±150 | OK |
| Example 7 | 5 | 0 | 3 | 0 | ±500 | ±150 | OK |

TABLE 2-continued

|  | Number of fillings (pieces) | | | | Set angle [°] | Intro-duction angle [°] | Deter-mination |
| --- | --- | --- | --- | --- | --- | --- | --- |
|  | 13a | 13b | 13c | 13d | | | |
| Example 8 | 1 | 0 | 3 | 4 | ±600 | ±150 | OK |
| Example 9 | 1 | 4 | 3 | 0 | ±500 | ±150 | OK |
| Comparative Example 2 | 0 | 0 | 3 | 5 | ±600 | ±75 | NG |
| Comparative Example 3 | 0 | 0 | 6 | 2 | ±600 | ±75 | NG |
| Comparative Example 4 | 0 | 0 | 3 | 0 | ±600 | ±70 | NG |
| Comparative Example 5 | 0 | 4 | 3 | 1 | ±600 | ±90 | NG |

Example 6

In the optical fiber cable of Example 6, the number of optical fibers 1 included in one optical fiber unit 10 is 144. The three inner units 10B are twisted in an SZ shape, and the nine outer units 10A are twisted in an SZ shape on the outer circumference thereof. That is, the total number of optical fiber units 10 is 12, and the total number of optical fibers 1 is 1728. Eight fillings 13a are provided, but fillings 13b to 13d are not provided. One filling 13a is disposed each between the outer units 10A.

The optical fiber unit 10 is twisted with the set angle of the twisting device (oscillator) set to ±400°. The "set angle" is in a range of angles at which the oscillator is oscillated. For example, when the set angle is ±400°, the oscillator repeats the operation of oscillating 400° in the CW direction and then oscillating 400° in the CCW direction. In this way, the twisted optical fiber unit 10 is wrapped with a wrapping tube 54 and further covered with a sheath 55 to prepare an optical fiber cable.

Example 7

As Example 7, an optical fiber cable is prepared in which the number of fillings 13a to 13d is changed from Example 6. Five fillings 13a are provided and three fillings 13c are provided. The set angle is ±500°. Other conditions are the same as in Example 6.

Example 8

As Example 8, an optical fiber cable is prepared in which the number of fillings 13a to 13d is changed from Example 6. As illustrated in FIG. 7, one filling 13a, three fillings 13c, and four fillings 13d are provided. Among the four fillings 13d, one filling is disposed coaxially with the cable central axis O, and the remaining three fillings are disposed along the circumference of the one filling. The set angle is ±600°. Other conditions are the same as in Example 6.

Example 9

Figure 8:
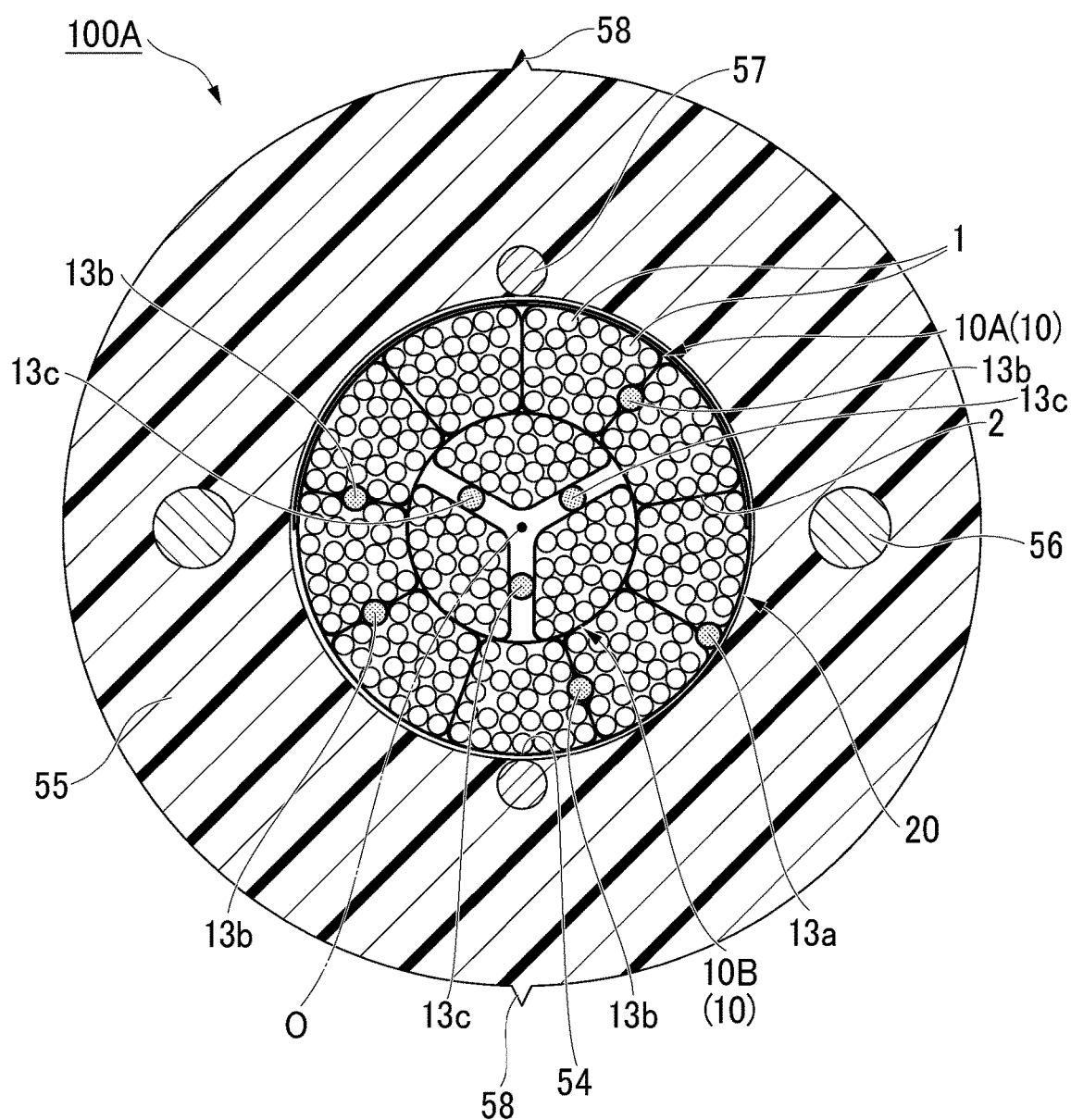
FIG. 8 is a cross-sectional view of an optical fiber cable according to another modification of the second embodiment.

As Example 9, an optical fiber cable is prepared in which the number of fillings 13a to 13d is changed from Example 6. As illustrated in FIG. 8, one filling 13a, four fillings 13b, and three fillings 13c are provided. No fillings 13d are provided. The set angle is ±500°. Other conditions are the same as in Example 6.

Comparative Example 2

As Comparative Example 2, an optical fiber cable 100A provided with three fillings 13c and five fillings 13d without fillings 13a and 13b is prepared. The set angle is ±600°. Other conditions are the same as in Example 6.

Comparative Example 3

As Comparative Example 3, an optical fiber cable 100A is prepared in which the numbers of fillings 13c and 13d are changed from Comparative Example 2. Other conditions are the same as in Comparative Example 2.

Comparative Example 4

As Comparative Example 4, an optical fiber cable 100A is prepared in which the numbers of fillings 13c and 13d are changed from Comparative Example 2. Three fillings 13c are provided and no fillings 13d are provided. Other conditions are the same as in Comparative Example 2.

Comparative Example 5

As Comparative Example 5, an optical fiber cable 100A is prepared in which the number of fillings 13b to 13d are changed from Comparative Example 2. Four fillings 13b, three fillings 13c, and one filling 13d are provided. Other conditions are the same as in Comparative Example 2.

Table 2 shows the results of checking the SZ twist angle (introduction angle) actually introduced into the outer unit 10A, for the optical fiber cables of Examples 6 to 9 and Comparative Examples 2 to 5. The manufactured optical fiber cable is cut at predetermined intervals in the longitudinal direction, and the position of a specific optical fiber or optical fiber unit in the circumferential direction is measured on each cut surface. The rotation angle of a specific optical fiber or optical fiber unit with respect to the cable central axis O is defined as the introduction angle. The larger the difference between the set angle and the introduction angle, the larger the outer unit 10A is untwisted.

In the "Determination" field of Table 2, the result is good (OK) when the introduction angle is ±135° or more, and the result is insufficient (NG) when the introduction angle is less than ±135°. The reason why the determination criterion is that the introduction angle is ±135° or more is as follows. For example, in a case where the outer unit 10A is not twisted, when the optical fiber cable is bent, the outer unit 10A is compressed inside the bend of the optical fiber cable and stretched outside the bend of the optical fiber cable. On the other hand, when the outer unit 10A is twisted in an SZ shape at an introduction angle of ±135° or more, one outer unit 10A is reliably disposed across both the compressed part and the stretched part. Since the introduction angle of ±135° or more is satisfied, it is possible to cancel out the tension and compression acting on the outer unit 10A, and to suppress the tension or strain acting on the optical fiber 1.

As shown in Table 2, it is possible to make the introduction angles of Examples 6 to 9 larger than the introduction angles of Comparative Examples 2 to 5. Further, in Examples 6 to 9, the introduction angle is ±135° or more, and good results are obtained. This is because the fillings 13a are in contact with the wrapping tube 54, and the frictional force between the fillings 13a and the wrapping tube 54 is able to suppress the outer unit 10A from untwisting.

From the comparison between Examples 6 to 9 and Comparative Examples 2 to 5, it is checked that the fillings 13a in contact with the wrapping tube 54 are able to suppress the untwisting of the outer unit 10A located in the outermost layer.

Further, from the comparison between Example 9 and Comparative Example 5, it is checked that it is possible to obtain a large untwisting suppressing effect by providing at least one filling 13a.

Further, from the comparison between Example 8 and Example 9, the filling 13b sandwiched between the outer units 10A has a more effective effect of suppressing untwisting than the filling 13d sandwiched between the inner units 10B.

Further, from Comparative Examples 2 to 5, it is checked that the untwisting suppressing effect is less affected by the change in the number and arrangement of the fillings 13b to 13d.

Further, in the optical fiber cable 100B of the third embodiment, fillings 3c are disposed in addition to fillings 13a and 13b. The filling 3c is sandwiched between one outer unit 10A and the wrapping tube 54. Therefore, the fillings 3c are less likely to move radially inward, and it is possible to more reliably maintain the state in which the fillings 3c are in contact with the wrapping tube 54. Thus, it is possible to effectively convert the force that the outer unit 10A tends to expand radially outward into a frictional force, and to obtain a more reliable untwisting suppressing effect.

Next, the result of examining the optimum density when fillings 13a, 13b, and 3c are provided will be described.

Here, the parameter of "Outer layer filling density D" is used. The outer layer filling density D is the density of fillings sandwiched between the outer units 10A among the plurality of optical fiber units 10 included in the core.

Figure 6:
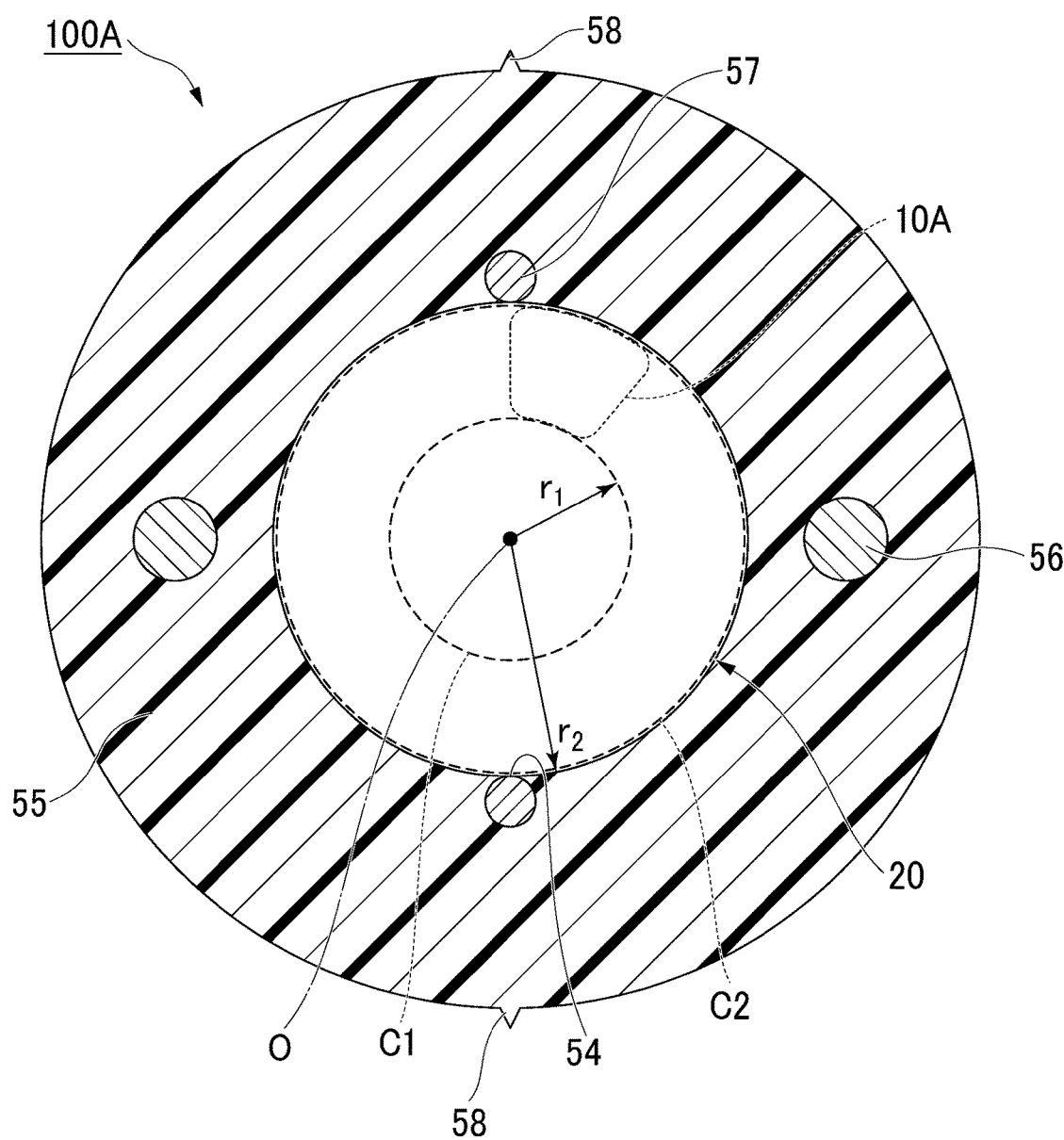
FIG. 6 is a schematic view showing the dimensions of each part of the optical fiber cable of FIG. 4.

Here, the outer layer filling density D will be described in more detail with reference to FIG. 6. The virtual circle C1 illustrated in FIG. 6 is an arc connecting the radially inner ends of the plurality of outer units 10A located in the outermost layer. The virtual circle C2 is an arc connecting the radially outer ends of the plurality of outer units 10A located in the outermost layer. The virtual circle C2 substantially overlaps the inner peripheral surface of the wrapping tube 54.

Dimension $r_1$ is the radius of the virtual circle C1 and dimension $r_2$ is the radius of the virtual circle C2. In other words, the dimension $r_1$ is the distance between the radially inner end of the outer unit 10A located in the outermost layer and the cable central axis O. The dimension $r_2$ is the distance between the radially outer end of the outer unit 10A located in the outermost layer (the inner circumferential surface of the wrapping tube 54) and the cable central axis O.

Regarding the plurality of outer units 10A located in the outermost layer, the positions of the radially inner ends may be non-uniform (the virtual circle C1 in FIG. 6 is non-circular). In that case, the average value of the distance between the radially inner end of each outer unit 10A and the cable central axis O is defined as the dimension $r_1$. The same applies when the virtual circle C2 is non-circular. That is, the average value of the distance between the radially outer end of each outer unit 10A and the cable central axis O is defined as the dimension $r_2$.

Here, the twisted states are different in the outermost layer (layer of the outer unit 10A) and the inner layer (layer of the inner unit 10B). Further, the fillings 13a, 13b, and 3c located in the outermost layer and the fillings 13c and 13d located in the inner layer have different roles. More specifically, the fillings 13a and 3c are in contact with the wrapping tube 54 to suppress untwisting. Further, although the fillings 13b do not come into contact with the wrapping tube 54, the fillings 13b are sandwiched between the outer units 10A and have the effect of suppressing the relative movement of the outer units 10A. On the other hand, since the fillings 13c and 13d are not in contact with the wrapping tube 54 and are not sandwiched between the outer units 10A, the effect of suppressing the untwisting of the outer unit 10A is small. Therefore, for the fillings 13a, 13b, and 3c disposed in the outermost layer, the density in the outermost layer is set to an appropriate value.

Therefore, the cross-sectional area A of the outermost layer is defined by the following Equation (1). In other words, the cross-sectional area A is the area of the region surrounded by the virtual circle C1 and the virtual circle C2.

$$A = \pi \times r_2^2 - \pi \times r_1^2 \quad (1)$$

Further, the outer layer filling density D is defined by the following Equation (2).

$$D = S \div A \quad (2)$$

In Equation (2), S is the sum of the cross-sectional areas of the fillings 13a, 13b, and 3c disposed in the region between the virtual circles C1 and C2. In other words, S is the sum of cross-sectional areas of parts of the fillings 13a to 13d, and 3c that are disposed in a region of which the distance from the cable central axis O is in a range of $r_1$ to $r_2$.

The Equation (2) can also be expressed as the following Equation (2)'.

$$D = S \div (\pi \times r_2^2 - \pi \times r_1^2) \quad (2)'$$

Table 2 shows the results of preparing a plurality of optical fiber cables by changing the outer layer filling density D. The conditions other than the amounts of fillings 13a are the same as the conditions in Example 6 above.

TABLE 3

| D | Set angle | Introduction angle | Transmission loss | Overall determination |
|---|---|---|---|---|
| 0.00 | ±600° | ±75° | OK | NG |
| 0.05 | ±600° | ±135° | OK | OK |
| 0.10 | ±600° | ±150° | OK | OK |
| 0.15 | ±600° | ±150° | OK | OK |
| 0.20 | ±600° | ±150° | OK | OK |
| 0.25 | ±600° | ±160° | NG | NG |

"Transmission loss" in Table 3 shows the measurement results according to ICEA S-87-640-2016. More specifically, for the single-mode optical fiber, the result is good (OK) when the transmission loss at a wavelength of 1550 nm is less than 0.30 dB/km, and the result is insufficient (NG) when the transmission loss is 0.30 dB/km or more.

The "Overall determination" in Table 3 is considered to be good (OK) when the results of both the introduction angle and the transmission loss are good. The determination criterion for the introduction angle is that it is good when the introduction angle is ±135° or more, as described in Example 6.

As shown in Table 3, in a case of 0.05≤D≤0.20, the overall determination is good.

On the other hand, in a case of D=0.00, the transmission loss is good, but the introduction angle is less than the reference value)(±135°, so that the overall determination is insufficient. This is because the fillings 13a and 3c are not disposed and the untwisting cannot be suppressed.

Further, in a case of D=0.25, the introduction angle is good, but the transmission loss is equal to or more than the reference value (0.30 dB/km), so that the overall determination is insufficient. This is because the lateral pressure acting on the optical fiber 1 of the outer unit 10A is rather increased by disposing the fillings 13a and 3c excessively.

From the above results, it is found that by setting the outer layer filling density D to 0.05 or more and 0.20 or less, it is possible to suppress the lateral pressure acting on the optical fiber 1 to be small while suppressing the untwisting of the outer unit 10A.

Further, even when the fillings 3c are disposed as in the third embodiment, by setting the outer layer filling density D to 0.05 or more and 0.20 or less, it is possible to suppress the lateral pressure acting on the optical fiber 1 to be small while suppressing the untwisting of the optical fiber unit 10A.

As described above, the optical fiber cable 100B includes: a plurality of optical fiber units 10 each having a plurality of optical fibers; a wrapping tube 54 that wraps around the plurality of optical fiber units 10; at least one filling 3c disposed inside the wrapping tube 54; and a sheath 55 that covers the wrapping tube 54, in which a plurality of outer units 10A included in the plurality of optical fiber units 10 that are located in an outermost layer are twisted in an SZ shape around a cable central axis O, and the filling 3c is sandwiched between one of the outer units 10A and the wrapping tube 54 in a cross-sectional view.

According to this configuration, when the bundle of the optical fiber unit 10 tends to expand radially outward, fillings 13a and 3c are compressed in the radial direction between the optical fiber unit 10A and the wrapping tube 54. That is, the fillings 13a and 3c twisted together with the optical fiber unit 10A are pressed against the wrapping tube 54. Since the fillings 13a and 3c are formed of a fibrous material, the friction coefficient between the optical fiber 1 and the fillings 13a and 3c, and the friction coefficient between the fillings 13a and 3c and the wrapping tube 54 are larger than the friction coefficient between the optical fiber 1 and the wrapping tube 54. Therefore, the frictional force generated when the optical fiber unit 10A is pressed against the wrapping tube 54 with the fillings 13a and 3c sandwiched between them is larger than the frictional force generated when the optical fiber unit 10A is directly pressed against the wrapping tube 54.

That is, when the optical fiber unit 10A tends to expand radially outward, the fillings 13a and 3c generate a large frictional force. Due to this frictional force, the optical fiber unit 10A is less likely to move with respect to the wrapping tube 54, and it is possible to suppress the untwisting of the optical fiber unit 10A.

Further, in the cross-sectional view, the filling 3c is surrounded by one optical fiber unit 10A and the wrapping tube 54. Therefore, when the bundle of the optical fiber unit 10 tends to expand radially outward, the fillings 3c are more reliably sandwiched between the optical fiber unit 10A and the wrapping tube 54. Further, the optical fiber unit 10A prevents the fillings 3c from moving radially inward, so that it is possible to more reliably maintain the state in which the fillings 3c are in contact with the wrapping tube 54.

Further, in the cross-sectional view, the filling 3c may be located on a straight line passing through the cable central axis O and the center point X of one optical fiber unit 10A.

With this configuration, it is possible to more efficiently convert the force that the optical fiber unit 10A tends to expand radially outward into a frictional force. Therefore, it is possible to more reliably suppress the untwisting of the optical fiber unit 10A.

Further, when the distance between the radially inner end of the outer unit 10A and the cable central axis O is $r_1$, the distance between the radially outer end of the outer unit 10A and the cable central axis O is $r_2$, and S is the sum of cross-sectional areas of parts the fillings disposed in a region of which a distance from the cable central axis is in a range of $r_1$ to $r_2$, the outer layer filling density D represented by $D=S \div (\pi \times r_2^2 - \pi \times r_1^2)$ may be 0.05 or more and 0.20 or less.

Thus, it is possible to suppress the lateral pressure acting on the optical fiber 1 to a small value while suppressing the untwisting of the optical fiber unit 10A.

It should be noted that the technical scope of the present invention is not limited to the above-described embodiments, and various modifications can be made without departing from the spirit of the present invention.

For example, in the examples of FIGS. 4 and 5, the core 20 includes a two-layer optical fiber unit 10. However, the number of layers of the optical fiber unit included in the core 20 may be 1 or 3 or more.

Further, when the core 20 includes a plurality of layers of optical fiber units, no fillings may be disposed between the optical fiber units (inner unit 10B in the examples of FIGS. 4 and 5) included in the layers other than the outermost layer.

Further, in the optical fiber cable 100B, a plurality of fillings 13d may be disposed at the center of the cable. The fillings 13d may not be located coaxially with the cable central axis O. The fillings 13d may not be disposed.

Fourth Embodiment

Hereinafter, an optical fiber cable of the present embodiment will be described with reference to the drawings. The same members as in the first embodiment are denoted by the same reference numerals, and a description thereof is omitted.

Figure 9:
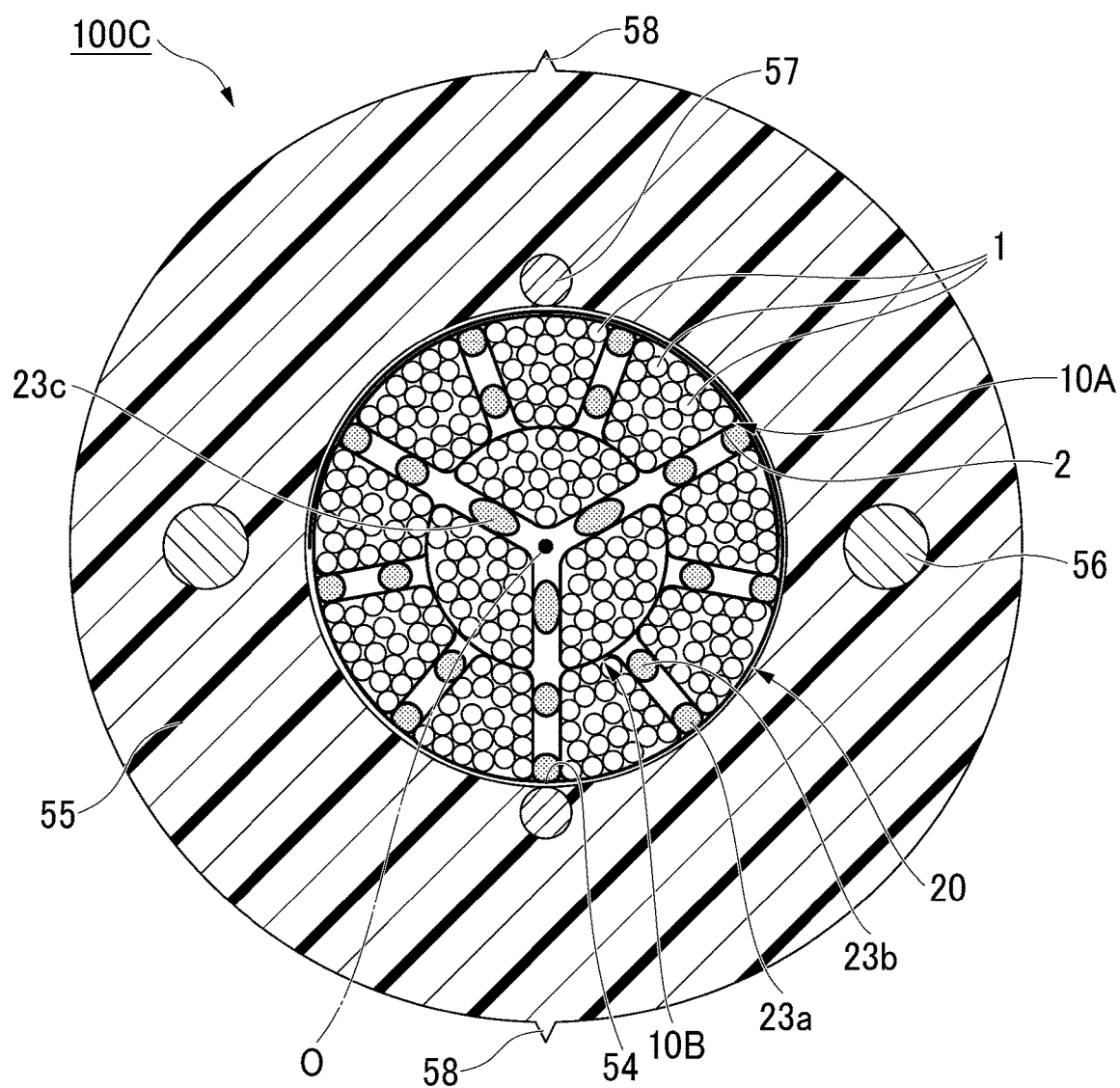
FIG. 9 is a cross-sectional view of an optical fiber cable according to a fourth embodiment.

As illustrated in FIG. 9, an optical fiber cable 100C includes a core 20 having a plurality of optical fiber units 10A, 10B, a sheath 55 accommodating the core 20 inside, and a pair of tensile strength members 56 (tension members) and a pair of wire bodies 57, which are embedded in the sheath 55. The core 20 has a wrapping tube 54 that wraps around a plurality of optical fiber units 10A and 10B.

(Direction Definition)

In the present embodiment, the central axis of the optical fiber cable 100C is referred to as the cable central axis O. Further, the longitudinal direction of the optical fiber cable 100C (longitudinal direction of the optical fiber units 10A and 10B) is simply referred to as the longitudinal direction. A cross section orthogonal to the longitudinal direction is called a cross section. In the cross-sectional view (FIG. 9), the direction intersecting the cable central axis O is called the radial direction, and the direction rotating around the cable central axis O is called the circumferential direction.

When the optical fiber cable 100C is non-circular in the cross-sectional view, the cable central axis O is located at the center of the optical fiber cable 100C.

The sheath 55 is formed in a cylindrical shape centered on the cable central axis O. As the material of the sheath 55, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used.

As the material of the wire body 57, a cylindrical rod made of PP, nylon, or the like can be used. Further, the wire body 57 may be formed of yarns in which fibers such as PP or polyester are twisted, and the wire body 57 may have water absorbency.

The pair of wire bodies 57 is disposed so as to sandwich the core 20 in the radial direction. Each wire body 57 is in contact with the outer peripheral surface of the core 20 (the outer peripheral surface of the wrapping tube 54). The number of wire bodies 57 embedded in the sheath 55 may be 1 or 3 or more.

As the material of the tensile strength member 56, for example, a metal wire (such as steel wire), a tension fiber (such as aramid fiber), FRP or the like can be used.

The pair of tensile strength members 56 is disposed so as to sandwich the core 20 in the radial direction. Further, the pair of tensile strength members 56 is disposed at intervals in the radial direction from the core 20. The number of tensile strength members 56 embedded in the sheath 55 may be 1 or 3 or more. Further, the tensile strength member 56 may not be embedded in the sheath 55.

A pair of protrusions 58 projecting radially outward is formed on the outer peripheral surface of the sheath 55. The protrusion 58 extends along the longitudinal direction.

The protrusion 58 and the wire body 57 are disposed at the same position in the circumferential direction. The protrusion 58 serves as a mark when the sheath 55 is incised in order to take out the wire body 57. Instead of the protrusion 58, a mark indicating the position of the wire body 57 may be provided, for example, by making a part of the sheath 55 different in color from the other parts.

The core 20 includes a plurality of optical fiber units 10A and 10B, a plurality of fillings 23a to 23c, and a wrapping tube 54. The wrapping tube 54 wraps the optical fiber units 10A and 10B and fillings 23a to 23c. Each of the optical fiber units 10A, 10B has a plurality of optical fiber core wires or optical fiber strands (hereinafter, simply referred to as optical fiber 1), and a binding material 2 for binding the optical fibers 1. The optical fiber units 10A and 10B and fillings 23a to 23c extend along the longitudinal direction.

The optical fiber units 10A and 10B of the present embodiment is a so-called intermittently-adhered optical fiber ribbon, and when a plurality of optical fibers 1 are pulled in a direction orthogonal to the longitudinal direction, the optical fibers 1 are adhered to each other so as to spread in a mesh form (spider web shape). Specifically, one optical fiber 1 is adhered to adjacent optical fibers 1 on both sides thereof at different positions in the longitudinal direction, and the adjacent optical fibers 1 are spaced apart from each other at a fixed interval in the longitudinal direction and are adhered to each other.

The modes of the optical fiber units 10A and 10B are not limited to the intermittently-adhered optical fiber ribbon, and may be changed as appropriate. For example, the optical fiber units 10A, 10B may be simply a bundle of a plurality of optical fibers 1 with a binding material 2.

As illustrated in FIG. 9, the optical fiber units 10A and 10B are divided into two layers, that is, a radially inner layer and a radially outer layer. The optical fiber unit 10A is located in the outermost layer. The optical fiber unit 10B is located in a layer inside the outermost layer (hereinafter referred to as an inner layer). The optical fiber unit 10B is located radially inside the optical fiber unit 10A. The optical fiber unit 10A located in the outermost layer is also referred to as an outer unit 10A. Further, the optical fiber unit 10B other than the optical fiber unit 10A is also referred to as an inner unit 10B. In the example of FIG. 9, three optical fiber units 10B are twisted together in an SZ shape or a spiral shape. Further, nine optical fiber units 10A are twisted in an SZ shape so as to surround the three optical fiber units 10B. The numbers of optical fiber units 10A and 10B can be changed as appropriate.

In the cross-sectional view, the optical fiber unit 10B located in the inner layer is formed in a fan shape, and the optical fiber unit 10A located in the outermost layer is formed in square. In addition, the present invention is not limited to the illustrated example, the optical fiber units 10A and 10B having a circular, elliptical, or polygonal cross section may be used. Further, the core 20 may be composed of one layer (layer of the optical fiber unit 10A) without the optical fiber unit 10B.

The binding material 2 has a long string shape and is wound around the plurality of optical fibers 1. The optical fiber 1 is partially exposed from the gap between the binding materials 2. Therefore, when the sheath 55 is incised and the wrapping tube 54 is removed, it is possible to visually recognize the optical fiber 1 from the gap between the binding materials 2. The binding material 2 is made of a thin and highly flexible material such as resin. Therefore, even in the state where the optical fibers 1 are bound with the binding material 2, the optical fibers 1 are appropriately moved to a vacant space in the sheath 55 while deforming the binding material 2. Therefore, the cross-sectional shapes of the optical fiber units 10A and 10B in the actual product may not be arranged as illustrated in FIG. 9.

The wrapping tube 54 is formed in a cylindrical shape centered on the cable central axis O. The inner peripheral surface of the wrapping tube 54 is in contact with the radially outer end of the optical fiber unit 10A. Further, the inner peripheral surface of the wrapping tube 54 is in contact with the filling 23a. As the wrapping tube 54, a non-woven fabric, a plastic tape member, or the like can be used. The wrapping tube 54 may be made of materials having water absorbency, such as a water-absorbent tape.

The fillings 23a to 23c are formed of a fibrous material such as polyester fiber, aramid fiber, and glass fiber. The fillings 23a to 23c may be yarns having water absorbency or the like. In this case, it is possible to enhance the waterproof performance inside the optical fiber cable 100C.

In the cross-sectional view, the fillings 23a are sandwiched between the optical fiber units 10A adjacent to each other in the circumferential direction and are in contact with the inner peripheral surface of the wrapping tube 54. The fillings 23a are disposed between the two optical fiber units 10A and the wrapping tube 54.

The fillings 23b are sandwiched between the optical fiber units 10A adjacent to each other in the circumferential direction.

The fillings 23b are located radially inside the fillings 23a and are not in contact with the inner peripheral surface of the wrapping tube 54. The fillings 23a and 23b are twisted together with the optical fiber unit 10A in an SZ shape. The fillings 23a and the fillings 23b are disposed at the same position in the circumferential direction. However, the position of the filling 23b in the circumferential direction may be different from the position of the filling 23a in the circumferential direction.

The fillings 23c are sandwiched between the optical fiber units 10B adjacent to each other in the circumferential direction.

The fillings 23c are located radially inside the fillings 23a and 23b, and are not in contact with the inner peripheral surface of the wrapping tube 54. The fillings 23c are twisted together with the optical fiber unit 10B in an SZ shape or a spiral shape. The fillings 23c may not be disposed.

The fillings 23a and 23b are in contact with the optical fiber unit 10A. The fillings 23c are in contact with the optical fiber unit 10B. Here, the binding material 2 has a thin and long string shape, and is wound around a bundle of the optical fibers 1 in a spiral shape, for example. Therefore, a part of the optical fiber 1 which is not covered with the string-shaped binding material 2 is partially in contact with the fillings 23a to 23c.

The optical fiber 1 usually has a structure in which an optical fiber bare fiber formed of glass is coated with a coating material such as a resin. Therefore, the surface of the optical fiber 1 is smooth, and the friction coefficient when the optical fibers 1 come into contact with each other is relatively small. On the other hand, the fillings 23a to 23c are formed of a fibrous material. Therefore, the friction coefficient when the fillings 23a to 23c are in contact with the optical fibers 1 is larger than the friction coefficient when the optical fibers 1 are in contact with each other.

From the above, it is possible to increase the frictional resistance when the optical fiber units 10A and 10B move relative to each other, by disposing the fillings 23a to 23c so as to be sandwiched between the plurality of optical fiber units 10A and 10B. This makes it possible to suppress the movement of the optical fiber units 10A and 10B in the optical fiber cable 100C.

Incidentally, in the present embodiment, the optical fiber unit 10A is twisted in an SZ shape. As a result, when the optical fiber cable 100C is bent, it is possible to improve the workability of the mid-span branching, while suppressing the action of tension or strain on the optical fiber 1 included in the optical fiber unit 10A.

On the other hand, when the optical fiber unit 10A is twisted in an SZ shape, it may be insufficient to suppress the untwisting of the optical fiber unit 10A. When a compressive force acts on the optical fiber cable 100C, it is also required to suppress the lateral pressure acting on the optical fiber unit 10A.

Therefore, in the present embodiment, the fillings 23a (second filling) and fillings 23b (third filling) are twisted together with the optical fiber unit 10A. The fillings 23a are in contact with the wrapping tube 54 while being sandwiched between the optical fiber units 10A, and the fillings 23b are located between the optical fiber units 10A radially inside the fillings 23a.

According to this configuration, since the fillings 23a are in contact with the wrapping tube 54, untwisting is less likely to occur as compared with the case where only the optical fiber unit 10A is in contact with the wrapping tube 54. This is because the frictional force acting between the fillings 23a and the wrapping tube 54 is larger than the frictional force acting between the optical fiber unit 10A and the wrapping tube 54. More specifically, since the fillings 23a are formed of a fibrous material, the friction coefficient between the fillings 23a and the wrapping tube 54 is high.

Further, in addition to the fillings 23a, fillings 23b are disposed between the optical fiber units 10A. The presence of the fillings 23b prevents the fillings 23a from moving radially inward, and it is possible to more reliably maintain the state in which the fillings 23a are in contact with the wrapping tube 54. Therefore, it is possible to more reliably achieve the effect of suppressing untwisting by the fillings 23a.

Further, the fillings 23a and the fillings 23b are disposed at the same position in the circumferential direction. With this configuration, it is possible to more reliably suppress the movement of the fillings 23a radially inward. Further, fillings 23a and 23b are disposed between the optical fiber units 10A in a well-balanced manner. Thus, when a compressive force acts on the optical fiber cable 100C, it is possible to reduce the lateral pressure acting on the optical fiber 1 included in the optical fiber unit 10A, by the fillings 23a and 23b acting as cushioning materials.

Further, the optical fiber unit 10A has a binding material 2 wound around the optical fibers 1, and the optical fibers 1 are partially exposed from the gap between the binding materials 2. Therefore, in the mid-span branching work, it is possible to easily visually recognize the optical fiber 1 by incising the sheath 55 and removing the wrapping tube 54, and the workability is enhanced.

Fifth Embodiment

Hereinafter, an optical fiber cable of a fifth embodiment will be described with reference to the drawings. The same members as in the first embodiment are denoted by the same reference numerals, and a description thereof is omitted.

Figure 10:
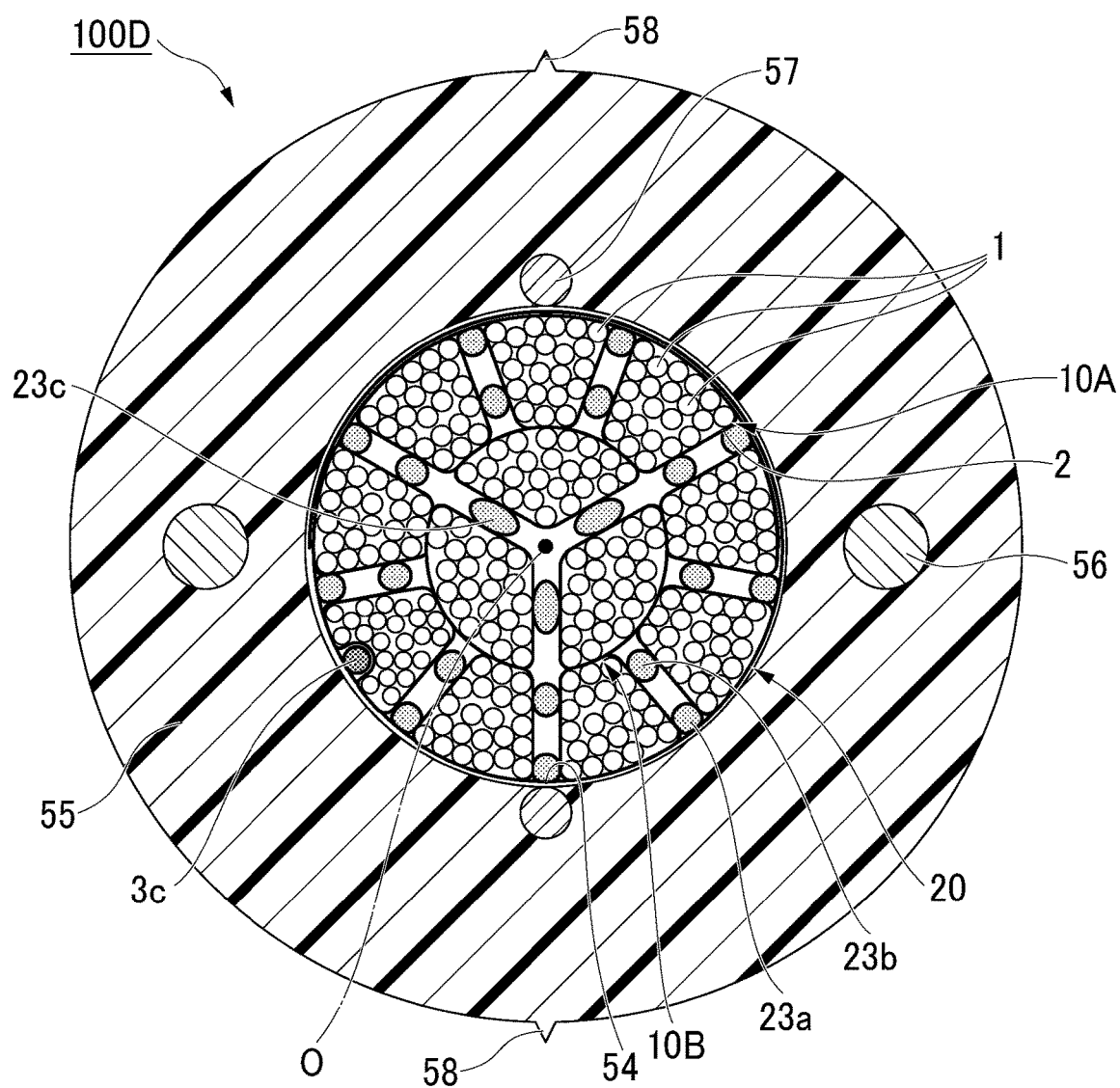
FIG. 10 is a cross-sectional view of an optical fiber cable according to a fifth embodiment.

FIG. 10 illustrates an optical fiber cable 100D according to the fifth embodiment. The fifth embodiment has the same basic configuration as the fourth embodiment, but the optical fiber cable 100D is different from the optical fiber cable 100C of FIG. 9 in having fillings 3c.

In the optical fiber cable 100D, the core 20 includes a plurality of optical fiber units 10A and 10B, a plurality of fillings 23a to 23c, 3c, and a wrapping tube 54. The wrapping tube 54 wraps the optical fiber units 10A and 10B and fillings 23a to 23c and 3c.

The filling 3c is sandwiched between one optical fiber unit 10A and the wrapping tube 54. The fillings 3c are twisted together with the optical fiber unit 10A in an SZ shape.

The fillings 3c are in contact with the wrapping tube 54 and the optical fiber unit 10A. Further, the part of the optical fiber 1 which is not covered with the string-shaped binding material 2 is partially in contact with the filling 3c.

Further, in the cross-sectional view, the fillings 3c may be located on the straight line L passing through the center point X of the optical fiber unit 10A and the cable central axis O.

EXAMPLES

Hereinafter, the fourth and fifth embodiments will be described with reference to specific examples. The present invention is not limited to the following examples.

In the present example, the optimum arrangement and amount of fillings are examined.

Example 10

As Example 10, an optical fiber cable having a cross-sectional structure as illustrated in FIG. 9 is prepared.

The number of optical fibers 1 included in each optical fiber unit 10A and 10B is 144. Three optical fiber units 10B are twisted in an SZ shape, and nine optical fiber units 10A are twisted in an SZ shape on the outer circumference thereof. That is, the total number of optical fiber units 10A and 10B is 12, and the total number of optical fibers 1 is 1728. Water-absorbent yarns are used as fillings 23a, 23b, and 23c. One filling 23a, eight fillings 23b, and three fillings 23c are disposed.

The optical fiber units 10A and 10B are twisted with the set angle of the twisting device (oscillator) set to ±600°. The "set angle" is in a range of angles at which the oscillator is oscillated. For example, when the set angle is ±600°, the oscillator repeats the operation of oscillating 600° in the CW direction and then oscillating 600° in the CCW direction. In this way, the twisted optical fiber units 10A and 10B are wrapped with a wrapping tube 54 and further covered with a sheath 55 to prepare an optical fiber cable.

Example 11

As Example 11, an optical fiber cable is prepared in which the numbers of fillings 23a and 23b are changed from Example 10. Three fillings 23a, six fillings 23b, and three fillings 23c are disposed. Other conditions are the same as in Example 10.

Example 12

As Example 12, an optical fiber cable having a cross-sectional structure as illustrated in FIG. 10 is prepared. The optical fiber cable of Example 12 has the number of fillings 23a and 23b changed from that of Example 10 and further includes fillings 3c. One filling 23a, seven fillings 23b, three fillings 23c, and one filling 3c are disposed. Other conditions are the same as in Example 10.

Comparative Example 6

As Comparative Example 6, an optical fiber cable 100C provided with fillings 23b and 23c without fillings 23a is prepared. Nine fillings 23b and three fillings 23c are disposed. Other conditions are the same as in Example 10.

Table 4 shows the results of checking the SZ twist angle (introduction angle) actually introduced into the optical fiber unit 10A, for the optical fiber cables of Examples 10 to 12 and Comparative Example 6. The manufactured optical fiber cable is cut at predetermined intervals in the longitudinal direction, and the position of a specific optical fiber or optical fiber unit in the circumferential direction is measured on each cut surface. The rotation angle of a specific optical fiber or optical fiber unit with respect to the cable central axis O is defined as the introduction angle. The larger the difference between the set angle and the introduction angle, the larger the optical fiber unit 10A is untwisted.

TABLE 4

|  | Number of fillings (pieces) | | | | | Set angle [°] | Introduction angle [°] | Determination |
| --- | --- | --- | --- | --- | --- | --- | --- | --- |
|  | 23a | 23b | 23c | 3c | total | | | |
| Example 10 | 1 | 8 | 3 | 0 | 12 | ±600 | ±150 | OK |
| Example 11 | 3 | 6 | 3 | 0 | 12 | ±600 | ±160 | OK |
| Example 12 | 1 | 7 | 3 | 1 | 12 | ±600 | ±155 | OK |
| Comparative Example 6 | 0 | 9 | 3 | 0 | 12 | ±600 | ±110 | NG |

In the "Determination" field of Table 4, the result is good (OK) when the introduction angle is ±135° or more, and the result is insufficient (NG) when the introduction angle is less than ±135°. The reason why the determination criterion is that the introduction angle is ±135° or more is as follows. For example, in a case where the optical fiber unit 10A is not twisted, when the optical fiber cable is bent, the optical fiber unit 10A is compressed inside the bend of the optical fiber cable and stretched outside the bend of the optical fiber cable. On the other hand, when the optical fiber unit 10A is twisted in an SZ shape at an introduction angle of ±135° or more, one optical fiber unit 10A is reliably disposed across both the compressed part and the stretched part. Since the introduction angle of ±135° or more is satisfied, it is possible to cancel out the tension and compression acting on the optical fiber unit 10A, and to suppress the tension acting on the optical fiber 1.

As shown in Table 4, it is possible to make the introduction angles of Examples 10 to 12 larger than the introduction angles of Comparative Example 6. Further, in Examples 10 to 12, the introduction angle is ±135° or more, and good results are obtained.

This is because the filling 23a is in contact with the wrapping tube 54, and the frictional force between the filling 23a and the wrapping tube 54 is able to suppress the optical fiber unit 10A from untwisting.

From the comparison between Examples 10 to 12 and Comparative Example 6, it is checked that the fillings 23a in contact with the wrapping tube 54 are able to suppress the untwisting of the optical fiber unit 10A located in the outermost layer. Further, from the comparison between Examples 10 and 12 and Comparative Example 6, it is checked that it is possible to obtain an appropriate introduction angle by disposing at least one filling 23a in contact with the wrapping tube 54.

Further, in Examples 10 to 12, the total number of fillings 23a and 3c in contact with the wrapping tube 54 is 1 in Example 10, 2 in Example 12, and 3 in Example 11, and the number increases in this order. Further, the introduction angle is ±150° in Example 10, ±155° in Example 12, and ±160° in Example 11, and the larger the total number of fillings 23a and 3c in contact with the wrapping tube 54, the greater the introduction angle is.

As described above, it is checked that the greater the number of fillings 23a and 3c in contact with the wrapping tube 54, the greater the effect of suppressing untwisting. This is because the frictional force between the fillings 23a and 3c and the wrapping tube 54 increases as the total number of fillings 23a and 3c in contact with the wrapping tube 54 increases.

Next, the result of examining the optimum density when fillings 23a, 23b, and 3c are provided will be described.

Here, the parameter of "Outer layer filling density D" is used. The outer layer filling density D is the density of fillings sandwiched between the optical fiber units located in the outermost layer among the plurality of optical fiber units included in the core.

Figure 11:
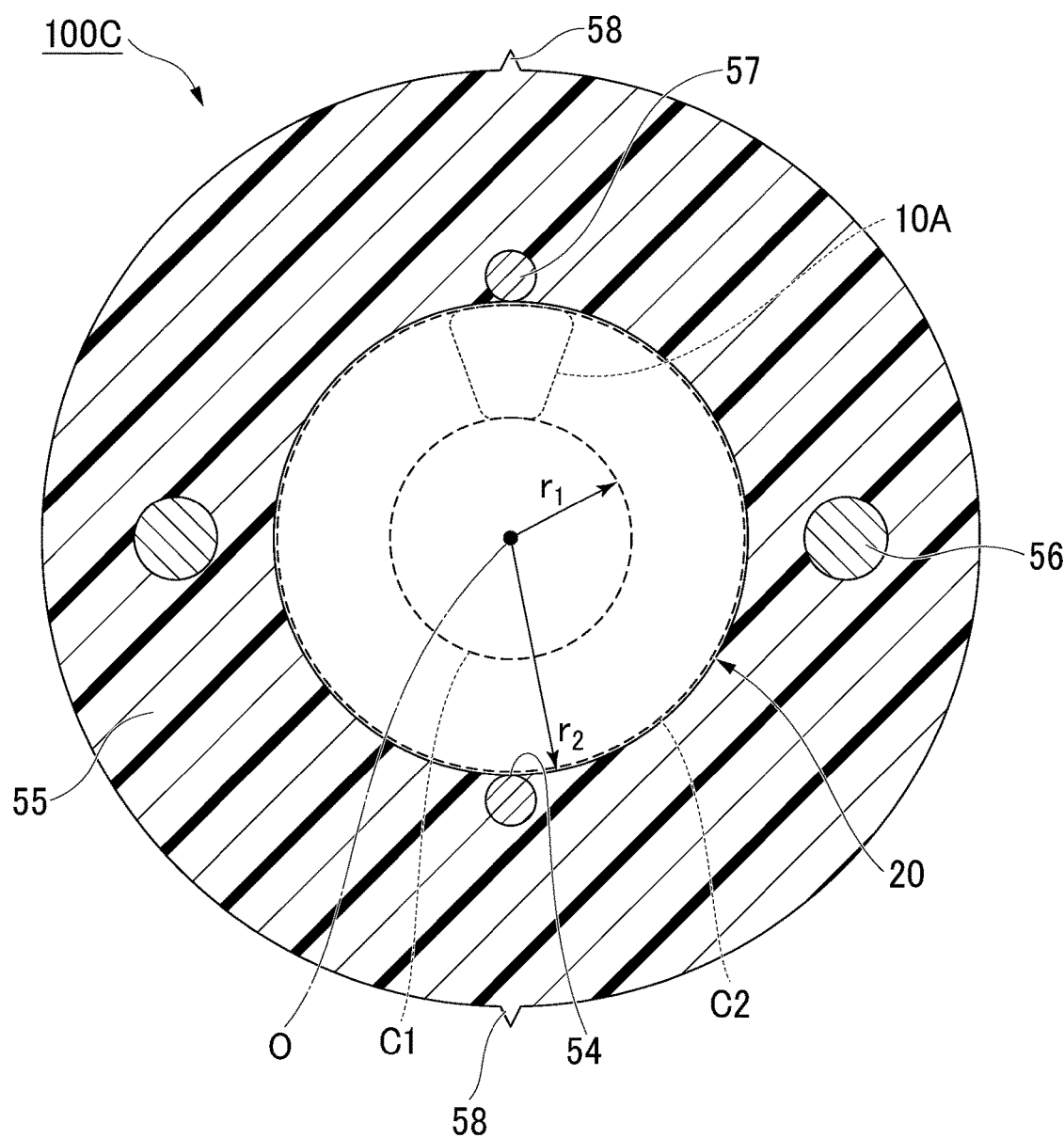
FIG. 11 is a schematic view showing the dimensions of each part of the optical fiber cable of FIG. 9.

Here, the outer layer filling density D will be described in more detail with reference to FIG. 11. The virtual circle C1 illustrated in FIG. 11 is an arc connecting the radially inner ends of the plurality of optical fiber units 10A located in the outermost layer. The virtual circle C2 is an arc connecting the radially outer ends of the plurality of optical fiber units 10A located in the outermost layer. The virtual circle C2 substantially overlaps the inner peripheral surface of the wrapping tube 54.

Dimension $r_1$ is the radius of the virtual circle C1 and dimension $r_2$ is the radius of the virtual circle C2. In other words, the dimension $r_1$ is the distance between the radially inner end of the optical fiber unit 10A located in the outermost layer and the cable central axis O. The dimension $r_2$ is the distance between the radially outer end of the optical fiber unit 10A located in the outermost layer (the inner circumferential surface of the wrapping tube 54) and the cable central axis O.

Regarding the plurality of optical fiber units 10A located in the outermost layer, the positions of the radially inner ends may be non-uniform (the virtual circle C1 in FIG. 11 is non-circular). In that case, the average value of the distance between the radially inner end of each optical fiber unit 10A and the cable central axis O is defined as the dimension $r_1$. The same applies when the virtual circle C2 is non-circular. That is, the average value of the distance between the radially outer end of each optical fiber unit 10A and the cable central axis O is defined as the dimension $r_2$.

Here, the twisted states are different in the outermost layer (layer of the optical fiber unit 10A) and the inner layer (layer of the optical fiber unit 10B). Further, the fillings 23a, 23b, and 3c located in the outermost layer and the fillings 23c located in the inner layer have different roles. More specifically, the fillings 23a and 3c are in contact with the wrapping tube 54 to suppress untwisting, and the fillings 23b suppress the fillings 23a from moving radially inward. Therefore, for the fillings 23a, 23b, and 3c disposed in the outermost layer, the density in the outermost layer is set to an appropriate value.

Therefore, the cross-sectional area A of the outermost layer is defined by the following Equation (1). In other words, the cross-sectional area A is the area of the region surrounded by the virtual circle C1 and the virtual circle C2.

$$A = \pi r_2^2 - \pi r_1^2 \quad (1)$$

Further, the outer layer filling density D is defined by the following Equation (2).

$$D = S \div A \quad (2)$$

In Equation (2), S is the sum of the cross-sectional areas of the fillings 23a, 23b, and 3c disposed in the region between the virtual circles C1 and C2.

The Equation (2) can also be expressed as the following Equation (2)'.

$$D = S \div (\pi \times r_2^2 - \pi \times r_1^2) \quad (2)'$$

Table 5 shows the results of preparing a plurality of optical fiber cables by changing the outer layer filling density D. The conditions other than the amounts of fillings 23a and 23b are the same as the conditions in Example 10. Further, the fillings 23a and 23b are disposed such that the amounts are equal to each other.

TABLE 5

| D | Set angle | Introduction angle | Transmission loss | Overall determination |
|---|---|---|---|---|
| 0.00 | ±600° | ±75° | OK | NG |
| 0.05 | ±600° | ±135° | OK | OK |
| 0.10 | ±600° | ±150° | OK | OK |
| 0.15 | ±600° | ±150° | OK | OK |
| 0.20 | ±600° | ±150° | OK | OK |
| 0.25 | ±600° | ±160° | NG | NG |

"Transmission loss" in Table 5 shows the measurement results according to ICEA S-87-640-2016. More specifically, for the single-mode optical fiber, the result is good (OK) when the transmission loss at a wavelength of 1550 nm is less than 0.30 dB/km, and the result is insufficient (NG) when the transmission loss is 0.30 dB/km or more.

The "Overall determination" in Table 5 is considered to be good (OK) when the results of both the introduction angle and the transmission loss are good. The determination criterion for the introduction angle is set such that the result is good when the introduction angle is ±135° or more, as described in Example 10.

As shown in Table 5, when 0.05≤D≤0.20, the overall determination is good.

On the other hand, in a case of D=0.00, the transmission loss is good, but the introduction angle is less than the reference value)(±135°, so that the overall determination is insufficient. This is because the fillings 23a and 23b are not disposed and the untwisting cannot be suppressed.

Further, in a case of D=0.25, the introduction angle is good, but the transmission loss is equal to or more than the reference value (0.30 dB/km), so that the overall determination is insufficient. This is because the lateral pressure acting on the optical fiber 1 of the optical fiber unit 10A is rather increased by disposing the fillings 23a and 23b excessively.

From the above results, it is found that by setting the outer layer filling density D to 0.05 or more and 0.20 or less, it is possible to suppress the lateral pressure acting on the optical fiber 1 to be small while suppressing the untwisting of the optical fiber unit 10A.

Further, even when the fillings 3c are disposed as in Example 12, by setting the outer layer filling density D to 0.05 or more and 0.20 or less, it is possible to suppress the lateral pressure acting on the optical fiber 1 to be small while suppressing the untwisting of the optical fiber unit 10A.

As described above, the optical fiber cable 100D includes: a plurality of optical fiber units 10A, 10B each having a plurality of optical fibers; a wrapping tube 54 that wraps around the plurality of optical fiber units 10A, 10B; at least one filling 3c disposed inside the wrapping tube 54; and a sheath 55 that covers the wrapping tube 54, in which a plurality of outer units 10A included in the plurality of optical fiber units 10A, 10B that are located in an outermost layer are twisted in an SZ shape around a cable central axis O, and the filling 3c is sandwiched between one of the outer units 10A and the wrapping tube 54 in a cross-sectional view.

According to this configuration, when the bundle of the optical fiber unit 10 tends to expand radially outward, fillings 23a and 3c are compressed in the radial direction between the optical fiber unit 10A and the wrapping tube 54. That is, the fillings 23a and 3c twisted together with the optical fiber unit 10A are pressed against the wrapping tube 54. Since the fillings 23a and 3c are formed of a fibrous material, the friction coefficient between the optical fiber 1 and the fillings 23a and 3c, and the friction coefficient between the fillings 23a and 3c and the wrapping tube 54 are larger than the friction coefficient between the optical fiber 1 and the wrapping tube 54. Therefore, the frictional force generated when the optical fiber unit 10A is pressed against the wrapping tube 54 with the fillings 23a and 3c sandwiched between them is larger than the frictional force generated when the optical fiber unit 10A is directly pressed against the wrapping tube 54.

That is, when the optical fiber unit 10A tends to expand radially outward, the fillings 23a and 3c generate a large frictional force. Due to this frictional force, the optical fiber unit 10A is less likely to move with respect to the wrapping tube 54, and it is possible to suppress the untwisting of the optical fiber unit 10A.

Further, in the cross-sectional view, the filling 3c is surrounded by one optical fiber unit 10A and the wrapping tube 54. Therefore, when the bundle of the optical fiber unit 10 tends to expand radially outward, the fillings 3c are more reliably sandwiched between the optical fiber unit 10A and the wrapping tube 54. Further, the optical fiber unit 10A prevents the fillings 3c from moving radially inward, so that it is possible to more reliably maintain the state in which the fillings 3c are in contact with the wrapping tube 54.

Further, in the cross-sectional view, the filling 3c may be located on a straight line passing through the cable central axis O and the center point X of one optical fiber unit 10A.

With this configuration, it is possible to more efficiently convert the force that the optical fiber unit 10A tends to expand radially outward c into a frictional force. Therefore, it is possible to more reliably suppress the untwisting of the optical fiber unit 10A.

Further, at least one second filling 23a and at least one third filling 23b located between the adjacent optical fiber units 10A may be further provided, and the second filling 23a may be in contact with the wrapping tube 54 and the third filling 23b may be located inside the second filling 23a in the radial direction.

The presence of the fillings 23b prevents the fillings 23a from moving radially inward, and it is possible to more reliably maintain the state in which the fillings 23a are in contact with the wrapping tube 54. Therefore, it is possible to more reliably achieve the effect of suppressing untwisting by the fillings 23a.

Further, the fillings 23a and the fillings 23b may be disposed at the same position in the circumferential direction. With this configuration, it is possible to more reliably suppress the movement of the fillings 23a radially inward. Further, fillings 23a and 23b are disposed between the optical fiber units 10A in a well-balanced manner. Thus, when a compressive force acts on the optical fiber cable 100D, it is possible to reduce the lateral pressure acting on the optical fiber 1 included in the optical fiber unit 10A, by the fillings 23a and 23b acting as cushioning materials.

Further, when the distance between the radially inner end of the optical fiber unit 10A and the cable central axis O is $r_1$, the distance between the radially outer end of the optical fiber unit 10A and the cable central axis O is $r_2$, and S is the sum of cross-sectional areas of parts of the fillings 23a to 23c, and 3c disposed in a region of which a distance from the cable central axis O is in a range of $r_1$ to $r_2$, the outer layer filling density D represented by $D=S\div(\pi\times r_2^2-\pi\times r_1^2)$ may be 0.05 or more and 0.20 or less.

Thus, it is possible to suppress the lateral pressure acting on the optical fiber 1 to a small value while suppressing the untwisting of the optical fiber unit 10A.

The fillings 23a to 23c and 3c may be formed of a fibrous material. As a result, it is possible to increase the frictional force when the fillings 23a to 23c and 3c come into contact with the optical fiber 1 and the wrapping tube 54.

The optical fiber units 10A, 10B may have binding materials 2 wound around a plurality of optical fibers 1, and the optical fiber 1 may be partially exposed from a gap between the binding materials 2. Thus, it is possible to bring into contact the optical fibers 1 exposed from the gap of the binding material 2 with the fillings 23a to 23c and 3c.

It should be noted that the technical scope of the present invention is not limited to the above-described embodiments, and various modifications can be made without departing from the spirit of the present invention.

For example, in the examples of FIGS. 9 and 10, the core 20 includes two layers of optical fiber units 10A and 10B. However, the number of layers of the optical fiber unit included in the core 20 may be 1 or 3 or more.

Further, when the core 20 includes a plurality of layers of optical fiber units, no fillings may be disposed between the optical fiber units (optical fiber units 10B in the examples of FIGS. 9 and 10) included in the layers other than the outermost layer.

In addition, without departing from the spirit of the present invention, it is possible to appropriately replace the constituent elements in the above-described embodiments with well-known constituent elements, and the above-described embodiments and modification examples may be appropriately combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical fiber
2 Binding material
3a to 3c, 13a to 13d, 23a to 23c Filling
10 Optical fiber unit
10A Outer unit
20 Core
54 Wrapping tube
55 Sheath
100, 100A, 100B, 100C, 100D Optical fiber cable
X Center point of outer unit
L Straight line
O Cable central axis

What is claimed is:

1. An optical fiber cable comprising:
   optical fiber units each comprising optical fibers;
   a wrapping tube that wraps around the optical fiber units;
   a filling disposed inside the wrapping tube; and
   a sheath that covers the wrapping tube, wherein
   the optical fiber units comprise outer units that are disposed at an outermost layer of the optical fiber units,
   the outer units are twisted in an SZ shape around a cable central axis of the optical fiber cable,
   the filling is sandwiched between one of the outer units and the wrapping tube in a cross-sectional view, and
   an outer layer filling density D represented by $D=S\div(\pi\times r_2^2-\pi\times r_1^2)$ satisfies 0.05 or more and 0.20 or less,
   where $r_1$ is a distance between a radially inner end of the outer units and the cable central axis,
   $r_2$ is a distance between a radially outer end of the outer units and the cable central axis, and
   S is a sum of cross-sectional areas of parts of the filling disposed in a region of which a distance from the cable central axis is in a range of $r_1$ to $r_2$.

2. The optical fiber cable according to claim 1, wherein the filling is disposed on a straight line passing through the cable central axis and a center point of one of the outer units, in a cross-sectional view.

3. The optical fiber cable according to claim 1, further comprising:
   a second filling and a third filling disposed between the optical fiber units adjacent to each other, wherein
   the second filling is in contact with the wrapping tube, and
   the third filling is disposed inside the second filling in a radial direction.

4. The optical fiber cable according to claim 3, wherein the second filling and the third filling are disposed at equivalent positions in a circumferential direction around the cable central axis of the optical fiber cable.

5. The optical fiber cable according to claim 1, wherein the filling is a fibrous material.

6. The optical fiber cable according to claim 1, wherein
the optical fiber units have binding materials wound around optical fibers, and
the optical fibers are partially exposed from a gap between the binding materials.

7. The optical fiber cable according to claim 1, wherein
the optical fiber units are disposed so as to provide with separated layers that include the outermost layer and a layer positioned inside of the outermost layer, and
a second filling and a third filling are disposed between the adjacent two optical fiber units in the outermost layer.

8. The optical fiber cable according to claim 7, wherein
the third filling is not in contact with the three or more optical fiber units positioned in the outermost layer.

9. The optical fiber cable according to claim 7, wherein
the second filling and the third filling are twisted in an SZ shape together with the optical fiber units positioned in the outermost layer.

10. The optical fiber cable according to claim 1, wherein
in a cross-sectional view, the filling is positioned inside a recessed portion that is formed in a radially outer edge of one of the outer units, and the filling is sandwiched between one of the outer units in which the recessed portion is formed and the wrapping tube.

11. The optical fiber cable according to claim 1, wherein
in a cross-sectional view, one of the outer units and the wrapping tube are in contact with each other, and sandwich the filling therebetween.

\* \* \* \* \*